(12) United States Patent
Medina et al.

(10) Patent No.: US 7,677,344 B2
(45) Date of Patent: *Mar. 16, 2010

(54) HYBRID REMOTE CONTROL LAWN MOWER

(76) Inventors: Luis M. Medina, 3153 Prides Crossing, Tarpon Springs, FL (US) 34688; Brian H. Nagamatsu, 8 Hillock Ct., Glenville, NY (US) 12302

(*) Notice: Subject to any disclaimer, the term of this patent is extended or adjusted under 35 U.S.C. 154(b) by 136 days.

This patent is subject to a terminal disclaimer.

(21) Appl. No.: 11/895,683

(22) Filed: Aug. 27, 2007

(65) Prior Publication Data

US 2007/0294991 A1 Dec. 27, 2007

Related U.S. Application Data

(63) Continuation-in-part of application No. 10/912,324, filed on Aug. 5, 2004, now Pat. No. 7,318,493.

(60) Provisional application No. 60/492,687, filed on Aug. 5, 2003.

(51) Int. Cl.
*B60T 7/16* (2006.01)

(52) U.S. Cl. ............... 180/167; 180/65.22; 180/65.285; 56/10.2 R

(58) Field of Classification Search ............ 180/65.22, 180/65.285, 2.1, 167, 168, 169, 6.48; 56/10.6, 56/11.9, 10.2 R; 701/22, 23, 82

See application file for complete search history.

(56) References Cited

U.S. PATENT DOCUMENTS

| | | | | |
|---|---|---|---|---|
| 2,698,507 A * | 1/1955 | Siebring | ...................... | 180/2.1 |
| 4,133,404 A | 1/1979 | Griffin | | |
| 4,301,881 A * | 11/1981 | Griffin | ...................... | 180/6.48 |
| 4,318,266 A * | 3/1982 | Taube | ...................... | 56/10.2 R |
| 4,694,639 A | 9/1987 | Chen et al. | | |
| 4,919,224 A * | 4/1990 | Shyu et al. | .................. | 180/168 |
| 4,947,324 A * | 8/1990 | Kamimura et al. | .......... | 180/169 |
| 4,964,265 A | 10/1990 | Young | | |
| 5,163,273 A | 11/1992 | Wojtkowski et al. | | |
| 5,461,292 A * | 10/1995 | Zondlo | ...................... | 180/169 |
| 5,502,957 A * | 4/1996 | Robertson | .................. | 56/11.9 |
| 5,572,856 A | 11/1996 | Ku | | |
| 5,974,347 A | 10/1999 | Nelson | | |
| 6,170,241 B1 * | 1/2001 | Shibilski et al. | ............. | 56/11.9 |
| 6,454,036 B1 * | 9/2002 | Airey et al. | ................. | 180/167 |
| 6,591,593 B1 * | 7/2003 | Brandon et al. | ............. | 56/10.6 |
| 6,604,348 B2 * | 8/2003 | Hunt | ........................ | 56/10.6 |
| 6,857,253 B2 * | 2/2005 | Reimers et al. | ............. | 56/10.6 |
| 7,239,944 B2 | 7/2007 | Dean | | |
| 7,318,493 B2 * | 1/2008 | Medina | ...................... | 180/167 |

\* cited by examiner

*Primary Examiner*—Hau V Phan

(57) ABSTRACT

A hybrid remote control lawn mower that includes embodiments to provide use in all seasons. These embodiments include, a wagon, a spreader, a dethacher, a leaf collector, a leaf blower, a lawn trimmer, a lawn edger, an edger, a hedge trimmer, a snow plow blade, a snow blower, etc. The hybrid remote control lawn mower allows an operator to stay at a safe distance away from the hybrid remote control lawn mower in dangerous places such as on steep hills.

37 Claims, 20 Drawing Sheets

HYBRID REMOTE CONTROL LAWN MOWER

The present patent application is a continuation-in-part of U.S. patent application Ser. No. 10/912,324, filed Aug. 5, 2004, now U.S. Pat. No. 7,318,493, and entitled "Hybrid Remote Control Lawn Mower." Ser. No. 10/912,324 is related to Provisional No. 60/492,687, filed Aug. 5, 2003.

BACKGROUND OF THE INVENTION

Lawn mowers are well known in the art. Typically, lawn mowers are used to cut grass in a lawn to a desired height.

SUMMARY OF THE INVENTION

The present invention provides a hybrid remote control lawn mower that allows an operator to control the hybrid remote control lawn mower from a remote location. Additionally, the hybrid remote control lawn mower may include other embodiments to provide use in all seasons. The embodiments may include a wagon, a spreader, a dethacher, a leaf collector, a leaf blower, a lawn trimmer, an edger, a hedge trimmer, a snow plow blade, a snow blower, or any other suitable attachment. The hybrid remote control lawn mower allows an operator to stay at a safe distance away from the hybrid remote control lawn mower in dangerous places such as on steep hills. Additionally, the hybrid remote control lawn mower allows a physically challenged operator to control the hybrid remote control lawn mower from a stationary location.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
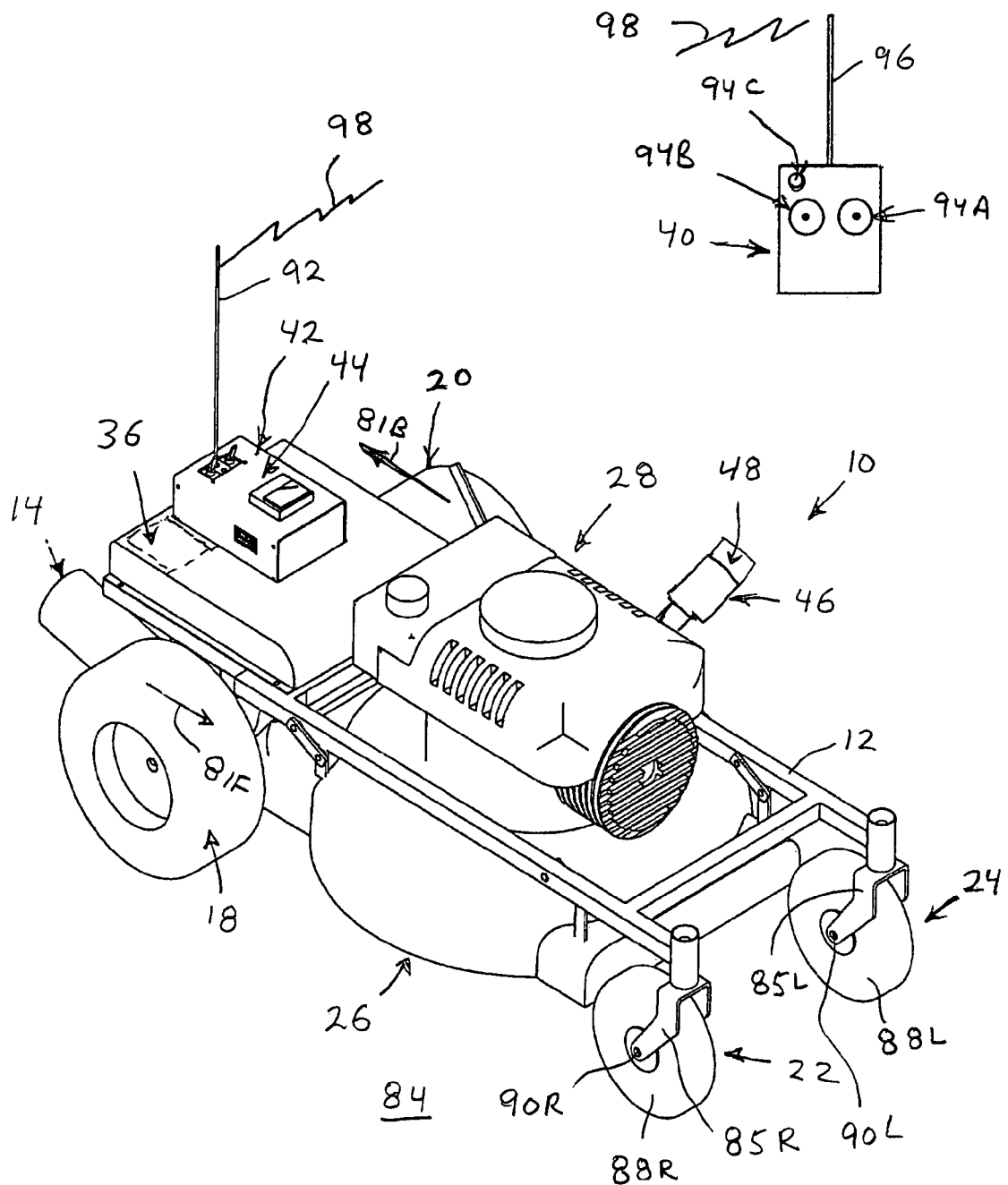
FIG. 1 illustrates a perspective view of a hybrid remote control lawn mower according to the present invention.
Figure 2:
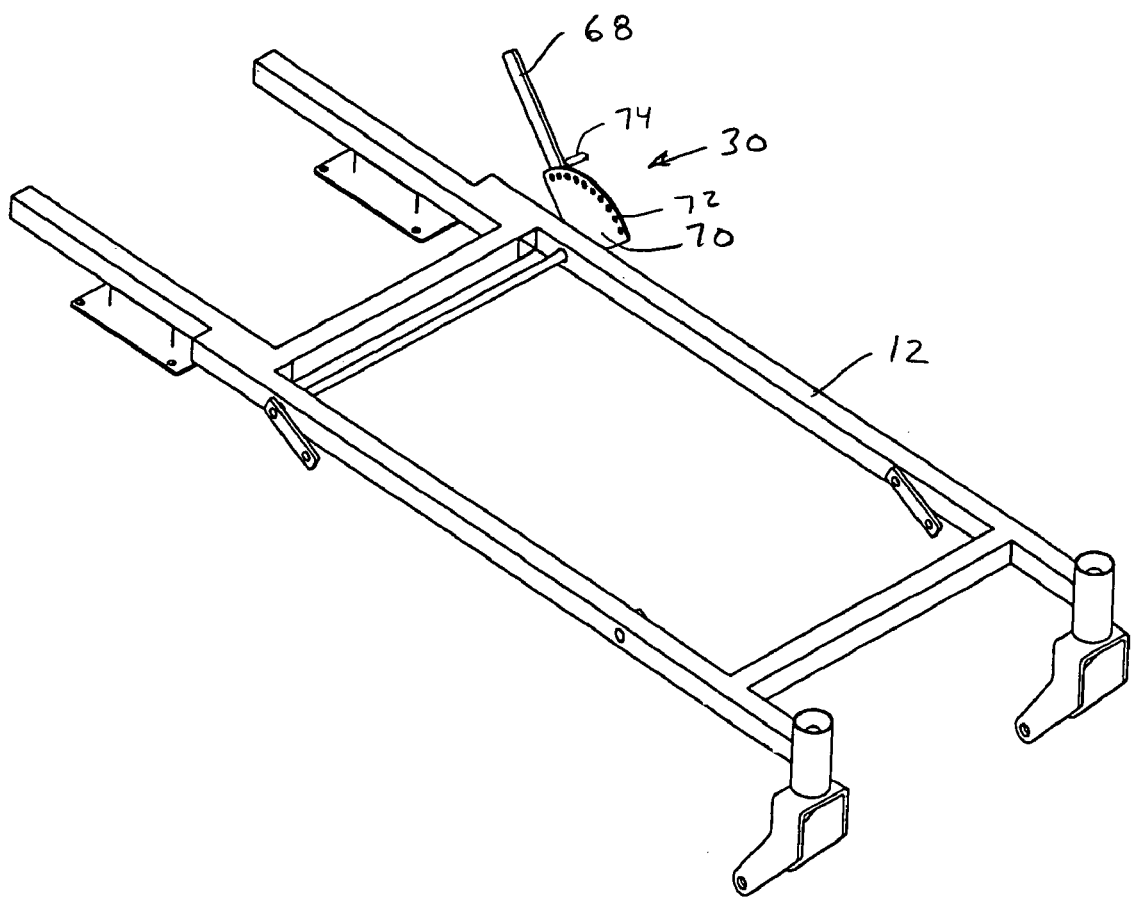
FIG. 2 illustrates a perspective view of a frame of the hybrid remote control lawn mower of the hybrid remote control lawn mower of FIG. 1.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

FIGS. 1, 2, 3, 4 and 5, illustrate a hybrid remote control lawn mower 10. The hybrid remote control lawn mower 10 includes a frame 12, a right rear motor apparatus 14, a left rear motor apparatus 16, a right rear wheel apparatus 18, a left rear wheel apparatus 20, a right front free swiveling wheel apparatus 22, a left front free swiveling wheel apparatus 24, a deck apparatus 26, an engine 28, a deck suspension apparatus 30, a lawn mower blade 32, an alternator apparatus 34, a battery 36, a voltage regulator 38, a remote transmitter apparatus 40, a receiver apparatus 42, and a brain control system 44. The engine 28 may include any suitable engine such as a gasoline engine, a diesel engine, a liquid petroleum gas engine, a bio fuel engine, a hydrogen engine, a fuel cell engine, or any other suitable engine.

Figure 5:
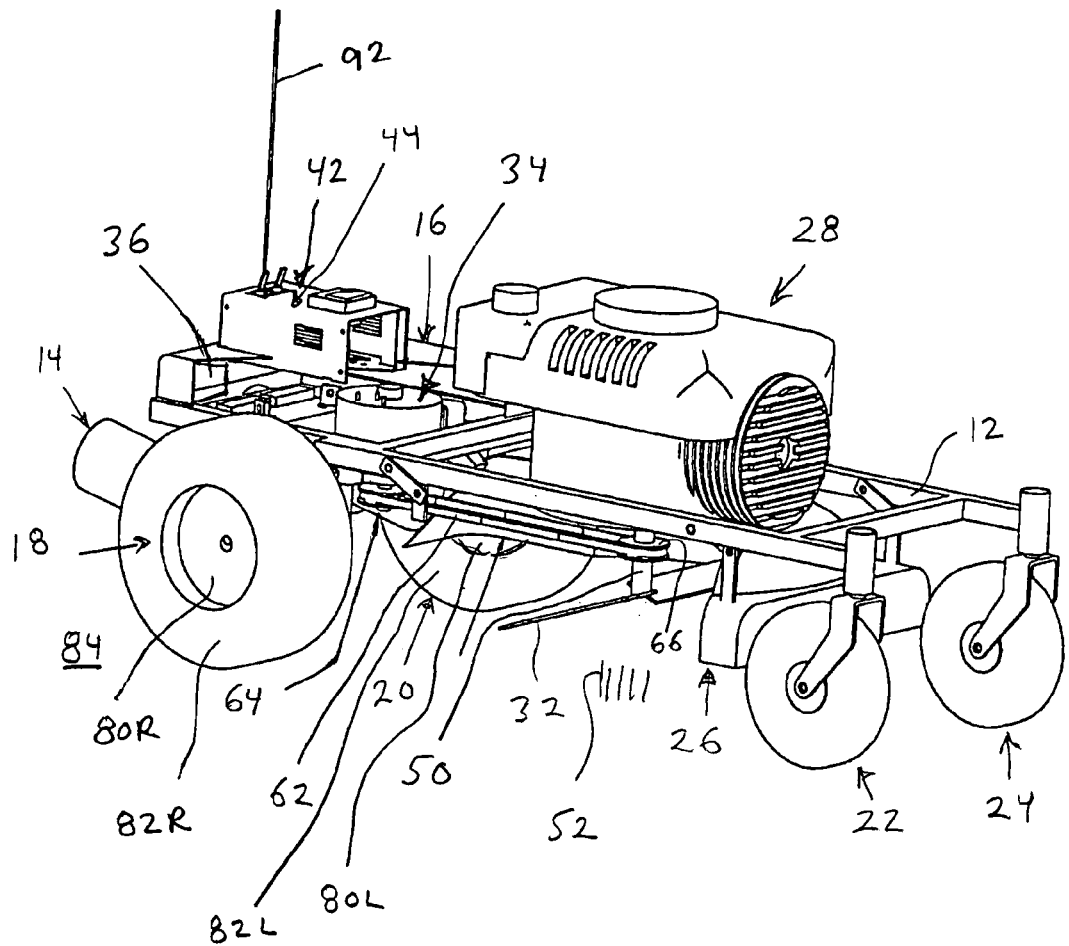
FIG. 5 illustrates a perspective view of the hybrid remote control lawn mower.

As illustrated in FIG. 1, the engine 28 may further include an emission control system 46. The emission control system 46 may include any suitable system such as a catalytic converter, lean burn system, or any other suitable system. The emission control system 46 enables the engine 28 to meet federal or state mandated air pollution emission standards. Additionally, as illustrated in FIG. 1 the engine 28 may include an exhaust silencer system 48 to keep noise levels below federal or state mandated noise levels. The engine 28 is attached to the deck apparatus 26. As illustrated in FIG. 5, the engine 28 includes a rotating drive shaft 50. The lawn mower blade 32 is attached to the rotating drive shaft 50 and rotates and cuts through lawn 52.

Figure 3:
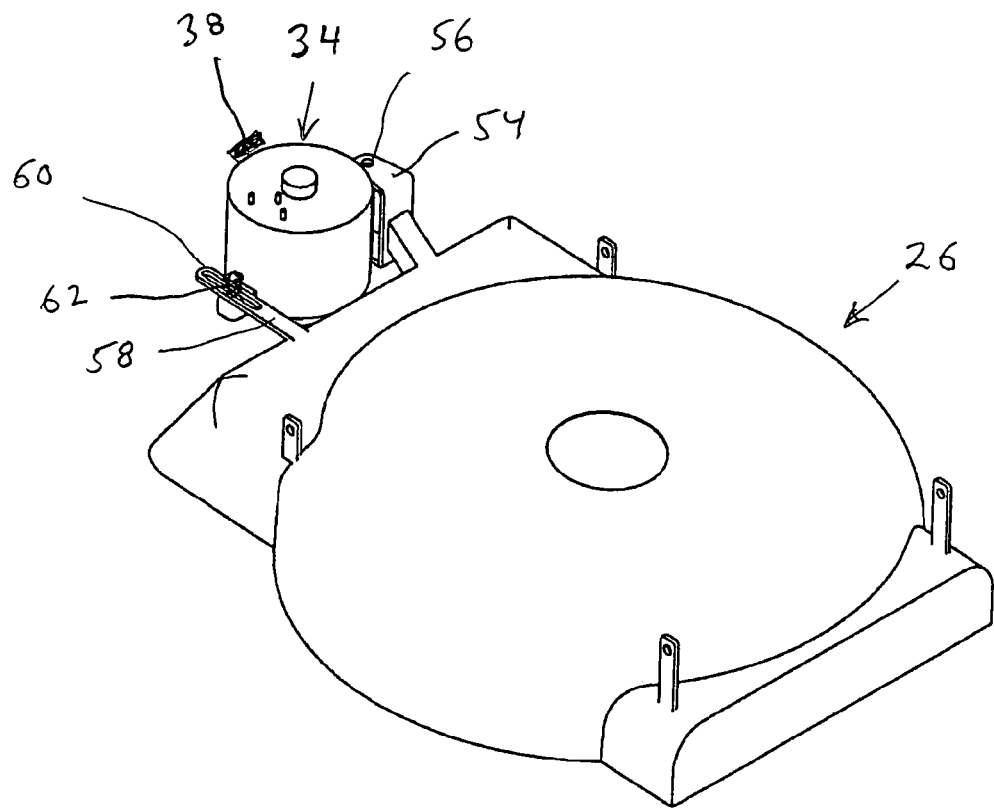
FIG. 3 illustrates a perspective view of a deck apparatus of the hybrid remote control lawn mower of FIG. 1.

As illustrated in FIG. 3, the alternator apparatus 34 is attached to the deck apparatus 26. A mounting arm 54 is rigidly attached to the deck apparatus 26. The alternator apparatus 34 rotates about a pivot bolt 56 attached to the mounting arm 54. A tensioning arm 58 is rigidly attached to the deck apparatus 26. The tensioning arm 58 includes an adjustment slot 60. A fastening device 62 such as a nut and bolt passes through the adjustment slot 60 and may secure the alternator apparatus 34 to the tensioning arm 58 at any location along the slot 60. As illustrated in FIG. 5, a drive belt 62 may couple a drive pulley 66 with an alternator pulley 64. The drive pulley 66 is mounted on the rotating drive shaft 50 of the engine 28. The alternator pulley 64 provides rotation to the alternator apparatus 34 to generate electric power. Tension in the drive belt 62 is adjusted by sliding the fastening device 62 along the adjustment slot 60 until a desired belt 62 tension is obtained. Then the fastening device 62 is tightened onto the tensioning arm 58, thus maintaining the desired drive belt 62 tension.

Alternatively, the alternator apparatus 34 may be connected with the engine 28 by any suitable means (e.g., gears, engine drive shaft 50, etc.).

Figure 4:
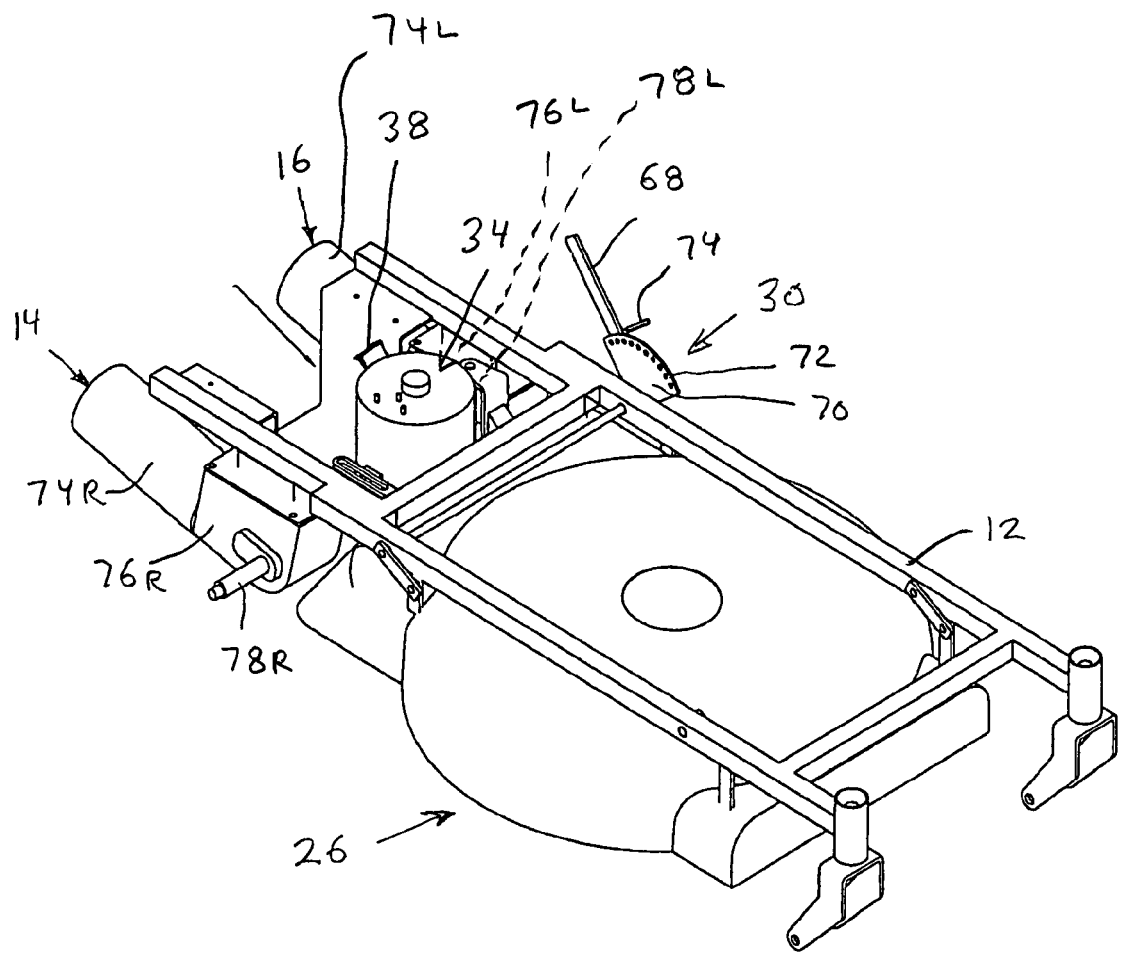
FIG. 4 illustrates a perspective view of the frame of FIG. 2, the deck apparatus of FIG. 3, an alternator apparatus, a right rear motor apparatus and a left rear motor apparatus.

As illustrated in FIG. 4, the deck apparatus 42 is suspended from the frame 12 by a deck suspension apparatus 30. The deck suspension apparatus 30 includes an adjustment lever arm 68 and an adjustment plate 70. The adjustment plate 70 is rigidly attached to the frame 12. The adjustment plate 70 includes a set of holes 72. A pin 74 is slid through the adjustment lever arm 68 and into one of the set of holes 72. An operator may swing the adjustment lever arm 68 to adjust the height between the deck apparatus 34 and the frame 12. Then the operator may slide the pin 74 through the adjustment lever arm 68 and through one of the set of holes 72 to maintain a desired height.

As illustrated in FIG. 4, the right rear motor apparatus 14 is attached to the frame 12. The left rear motor apparatus 16 is attached to the frame 12. The right rear motor apparatus 14 includes a motor 74R, a gearbox 76R and a wheel drive shaft 78R. The left rear motor apparatus 16 includes a motor 74L, a gearbox 76L and a wheel drive shaft 78L. The motors 74R and 74L may include any suitable motors such as DC electric motors. As illustrated in FIG. 5, the right rear wheel apparatus 18 includes a right rear wheel 80R and a right rear tire 82R. The left rear wheel apparatus 20 includes a left rear wheel 80L and a left rear tire 82L. The right rear wheel 80R is attached to the wheel drive shaft 78R. The left rear wheel 80L is attached to the wheel drive shaft 78L. As illustrated in FIG. 5, the right rear tire 82R and the left rear wheel 82L rest upon a support surface 84. The right rear tire 82R and the left rear tire 82R may include any suitable tread pattern (e.g., smooth, knobby, V shaped, etc.). The motor 74R provides rotation through the gearbox 76R which provides rotation through the wheel drive shaft 78R to the right rear tire 82R. The motor 74L provides rotation through the gearbox 76L which provides rotation through the wheel drive shaft 78L to the left rear tire 82L. The gear boxes 76R and 76L may include any suitable gear ratios that do not overload the motors 74R and 74L. For a tire with a diameter of about 12 inches a suitable gear ratio is about 25 or higher.

FIG. 1 illustrates the right front free swiveling wheel apparatus 22 and the left front swiveling wheel apparatus 24. The right front free swiveling wheel apparatus 22 includes a wheel support 85R and a tire 88R. The wheel support 85R is rotatably attached to the frame 12. The tire 88R rotates about a shaft 90R. The tire 88R rests upon the support surface 84. The left front free swiveling wheel apparatus 24 includes a wheel support 85L and a tire 88L. The wheel support 85L is rotatably attached to the frame 12. The tire 88L rotates about a shaft 90L. The tire 88L rests upon the support surface 84.

Figure 8:
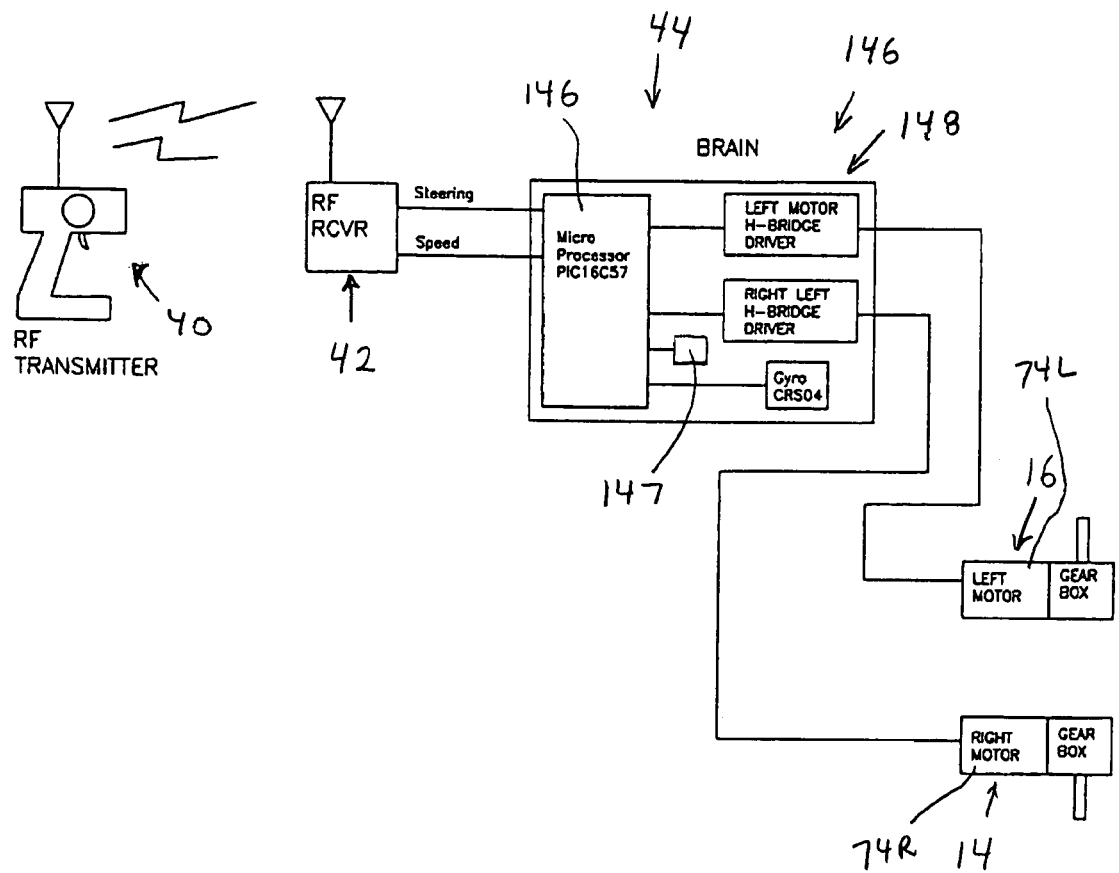
FIG. 8 illustrates a diagramatic view of a brain control system.
Figure 9:
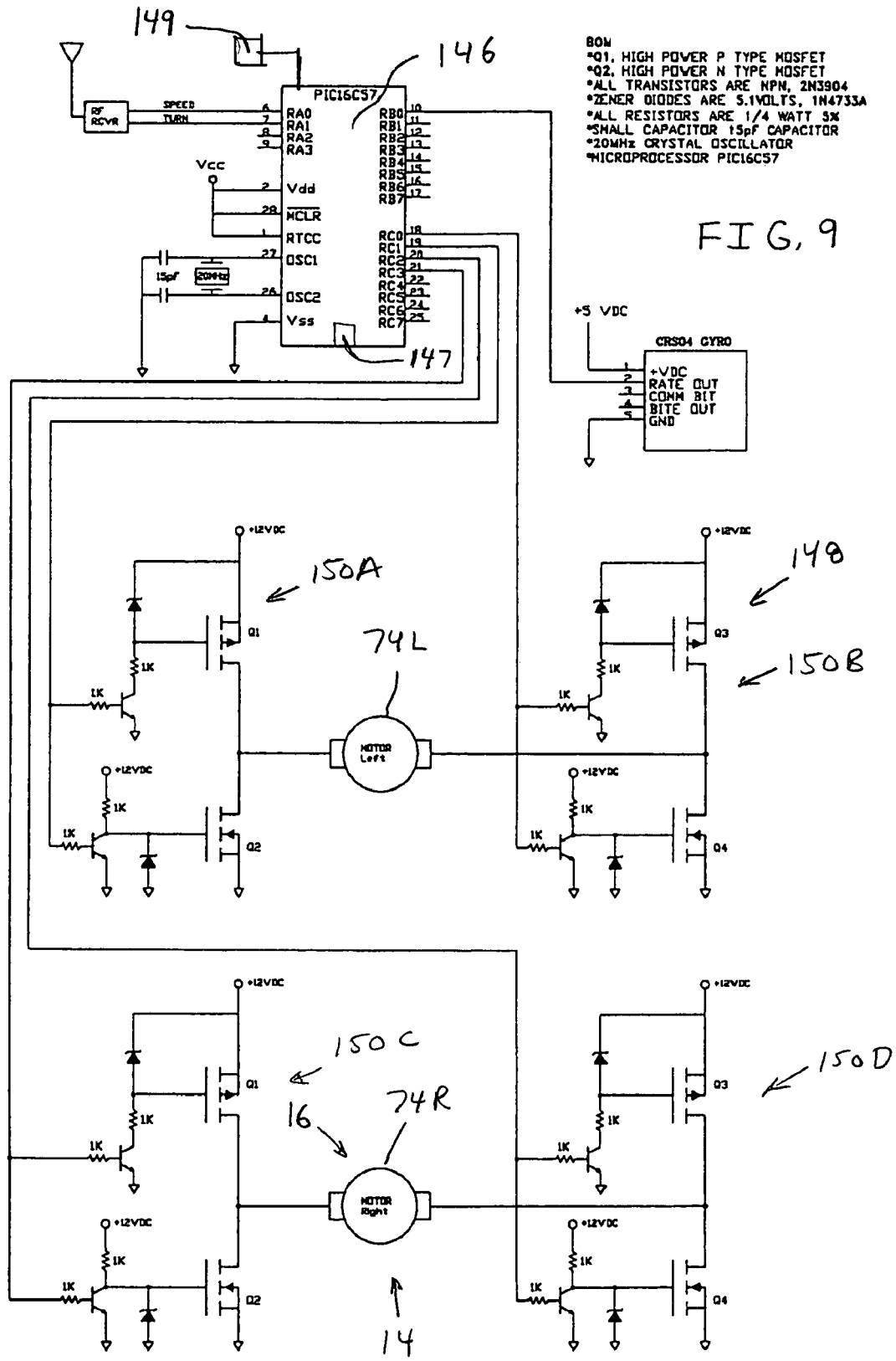
FIG. 9 illustrates a diagramatic view of the brain control system including MOSFETs.

FIG. 1 illustrates the receiver apparatus 42 and the brain control system 44. The receiver apparatus 42 includes a receiver antenna 92. The remote transmitter apparatus 40 includes input control modules 94A, 94B and 94C. Additionally, the remote transmitter apparatus 40 includes a transmitter antenna 96. The operator may input desired command control signals (e.g., such as direction, speed, starting, stopping, etc.) through the input control modules 94A, 94B and 94C. The remote transmitter apparatus 40 translates the operator command control signals and transmits the control signals through a radio wave signal 98. The radio wave signal 98 is received through the receiver antenna 92 of the receiver apparatus 42. The receiver apparatus 42 sends the command control signals to the brain control system 44. The brain control system 44 sends speed and direction signals to the right rear motor apparatus 14 and the left rear motor apparatus 16. The hybrid remote control lawn mower 10 is then propelled in a desired direction and speed on the support surface 84. FIG. 8 shows a loss of radio wave signal detector 147 included in the brain control system 44. When the loss of radio wave signal detector 147 detects a loss of radio wave signal 98 between the remote transmitter apparatus 40 and the receiver apparatus 42, the brain control system 44 turns the engine 28 off and stops the power to the motors 74L and 74R. FIG. 9 shows a current sensor device 149 to measure the current going to the right rear motor 74R and the left rear motor 74L. The current sensor device 149 may be any suitable device (e.g., Hall effect sensor, current transformer, etc.). To protect the right rear motor 74R and the left rear motor 74L, the brain control system 44 shuts off the engine 28 and the current to the motors 74R and 74L when the current exceeds a preset current level.

Figure 6:
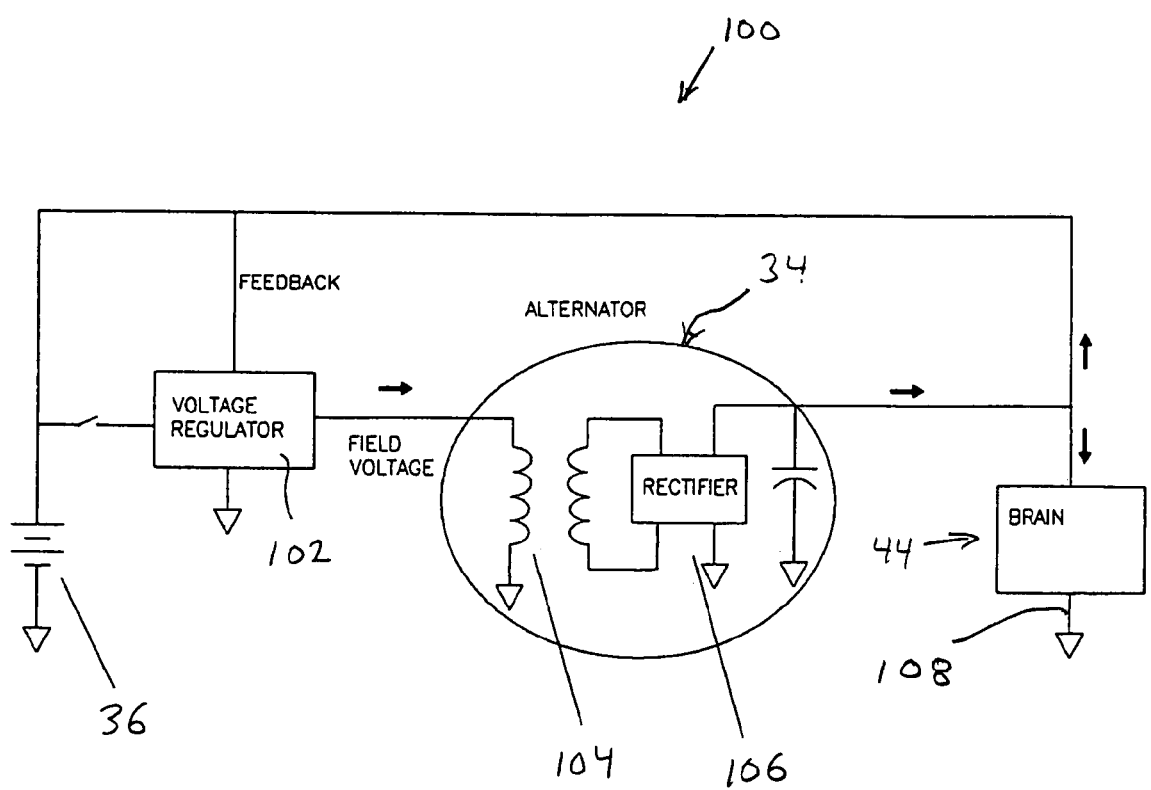
FIG. 6 illustrates a diagramatic view of a charger system.

FIG. 6 includes a diagrammatic view of a charger system 100. FIG. 6 illustrates the battery 36, the alternator apparatus 34, a voltage regulator 102 and the brain control system 44. The alternator apparatus 34 includes an alternator rotor 104 and an alternator stator 106. The alternator rotor 104 rotates and the alternator stator 106 provides electrical power 108. The voltage regulator 102 regulates the electrical power to any suitable voltage level (e.g., 12 volts, 24 volts, etc.). The brain control system 44 sends desired electrical power 108 to the right rear motor apparatus 14 and the left rear motor apparatus 16. The battery 36 may include any suitable voltage (e.g., 12 volts, 24 volts, etc.).

Figure 7:
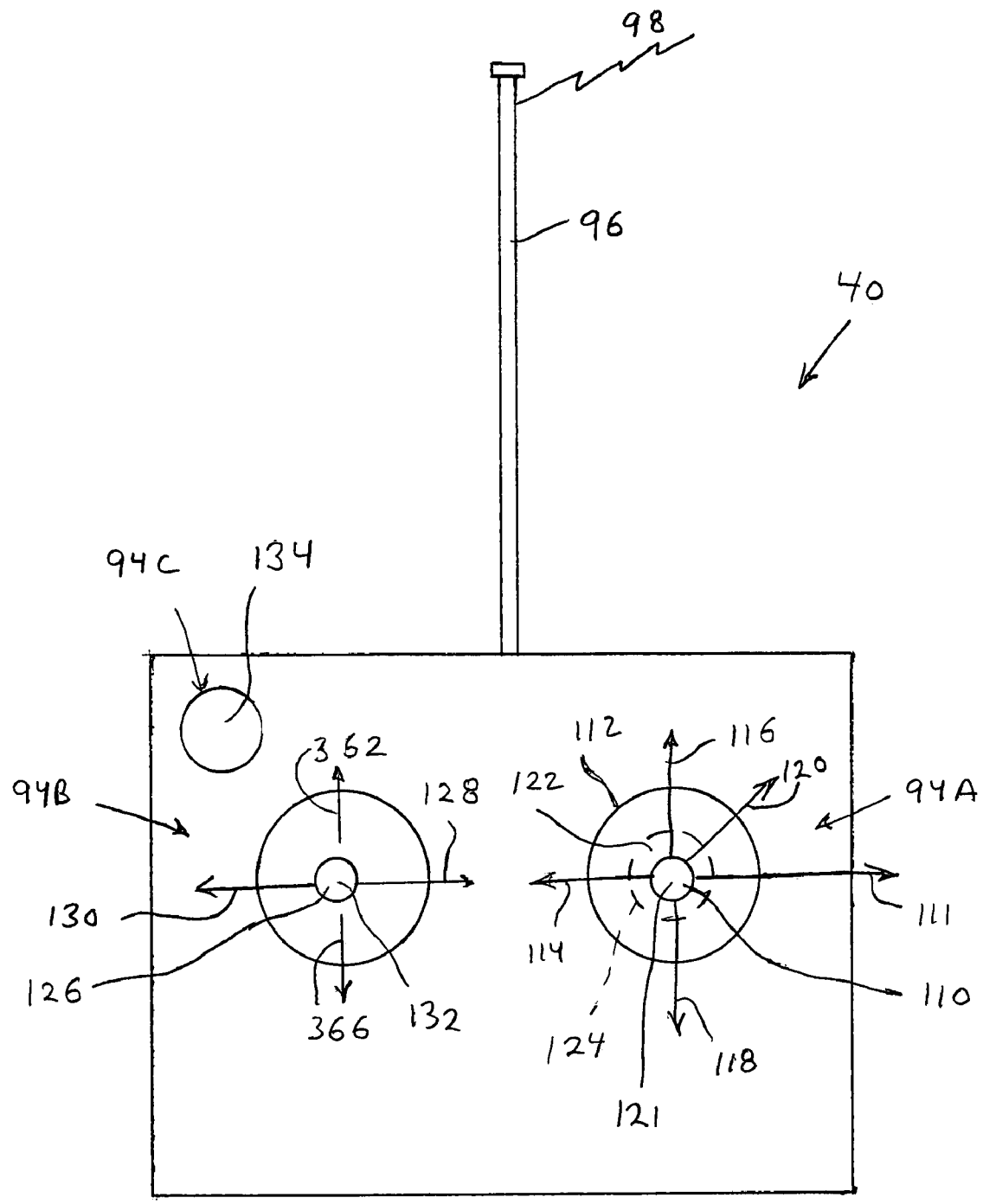
FIG. 7 illustrates a front view of a remote transmitter apparatus.

FIG. 7 illustrates a front view of the remote transmitter apparatus 40. The remote transmitter apparatus 40 includes the transmitter antenna 96 and the input control modules 94A, 94B and 94C. Input control module 94A includes an input control stick 110. The operator may push the input control stick 110 in any desired direction to control the direction of the hybrid remote control lawn mower 10. For example if the operator pushes the input control stick 110 towards a right direction (direction arrow 111) the hybrid remote control lawn mower 10 will steer towards the right. If the operator pushes the input control stick 110 towards a left direction (direction arrow 114) the hybrid remote control lawn mower 10 will steer towards the left. If the operator pushes the input control stick 110 towards a forward direction (direction arrow 116) the hybrid remote control lawn mower 10 will steer in a straight forward direction. If the operator pushes the input control stick 110 towards a rear direction (direction arrow 118) the hybrid remote control lawn mower 10 will steer in a straight backward direction. Additionally, any movement of the input control stick 110 in an intermediate direction will cause the hybrid remote control lawn mower 10 to steer in that direction. For example, if the operator pushes the input control stick 110 in a direction (direction arrow 120, the hybrid remote control lawn mower 10 would steer in the corresponding direction 120.

The operator may control the speed of the hybrid remote control lawn mower 10 by how far the operator pushes the input control stick 110 towards the circle 112. If the operator releases the input control stick 110, the input control stick 110 returns to a position at the center 121 of the circle 112 and the hybrid remote control lawn mower 10 comes to a stop with no movement. An outer boundary of a precision low speed control region 122 is indicated by a dotted circle 124. When the operator moves the input control stick 110 within this precision low speed control region 122, the speed of the hybrid remote control lawn mower 10 is limited to a very slow speed. This enables the operator to safely maneuver the hybrid remote control lawn mower 10 at very slow speeds. Without this precision low speed control region 122 the hybrid remote control lawn mower could suddenly move an unwanted distance when the operator slightly moved the input control stick 110. This precision low speed control region 122 allows the operator to maneuver the hybrid remote control lawn mower 10 in tight spaces such as when parking in a garage. When the operator pushes the input control stick 110 outside of the outer boundary 124 of the precision low speed control region 122, the hybrid remote control lawn mower 10 is allowed to move at higher speeds. The precision low speed control region 122 is controlled in the brain control system 44. Additionally, when the engine 28 is not running, the hybrid remote control lawn mower 10 motors 74R and 74L the brain control system 44 and the battery 36 are still fully operational so that the operator may still drive the remote control lawn mower 10 in any desired direction. This is useful when the operator desires to park the unit in a garage without the engine 28 running.

FIG. 7 illustrates the input control module 94B including an input control stick 126. The operator may push the input control stick 126 towards a right direction (direction arrow 128) to start the engine 28. The engine may include an electric starter (not shown) to automatically start the engine 28. The operator may push the input control stick 126 towards a left direction (direction arrow 130) to turn the engine 28 off. When the operator releases the input control stick 126, the input control stick 126 returns to a center position 132. As an option, when the engine 28 is turned off and not running, the operator may push the input control stick 126 towards the left (direction arrow 130) twice in rapid sequence and this signals the brain control system 44 to implement a system reset. This is only used when for some reason the brain control system 44 needs to reset.

FIG. 7 illustrates the input control module 94C including a safety button 134. As an option, the safety button 134 may be provided such that the operator must keep the safety button 134 depressed in order for the hybrid remote control lawn mower 10 to operate and move. If the operator releases the safety button 134 the hybrid remote control lawn mower 10 would immediately stop and turn off.

Additional control modules 94 or control channels may be added to provide additional remote operating features to the hybrid remote control lawn mower 10.

FIG. 8 illustrates a diagramatic view of the remote transmitter apparatus 40, the receiver apparatus 42, the brain control system 44 and the right rear motor apparatus 14 and the left rear motor apparatus 16. The brain control system 44 includes a microprocessor 146 and a propulsion control system 148. The operator provides control signals (e.g., direction, speed, starting, stopping, etc.) through the input control modules 94A, 94B and 94C of the remote transmitter apparatus 40 (FIG. 7). The remote transmitter apparatus 40 sends command signals (e.g., direction, speed, starting, stopping, etc.) to the receiver apparatus 42. The receiver apparatus 42 sends command signals to the microprocessor 146. The microprocessor 146 sends command signals to the propulsion control system 148 to operate the speed and direction of the right rear motor apparatus 14 and the left rear motor apparatus 16. FIG. 9 illustrates a diagramatic view of the microprocessor 146, the propulsion control system 148, the right rear motor apparatus 14 and the left rear motor apparatus 16. A forward direction is indicated by a direction arrow 81F as shown in FIG. 1. A backward direction is indicated by a direction arrow 81B as shown in FIG. 1. To travel in the forward direction 81F the right rear wheel 80R and the left rear wheel 80L rotate in the same forward direction 81F to provide forward movement to the hybrid remote control lawn mower 10. To travel in the backward direction 81B the right rear wheel 80R and the left rear wheel 80L rotate in the same backward direction 81B to provide backward movement to the hybrid remote control lawn mower 10. To travel in a straight line the right rear wheel 80R and the left rear wheel 80L rotate at the same speed. When traveling forward and turning right, the left rear wheel 80L rotates faster than the right rear wheel 80R. When traveling forward and turning left, the right rear wheel 80R rotates faster than the left rear wheel 80L. To provide zero turning radius to the right, the left rear wheel 80L rotates in the forward direction 81F while the right rear wheel 80R rotates in the backward direction 81B To provide zero turning radius to the left, the right rear wheel 80R rotates in the forward direction 81F and the left rear wheel 80L rotates in the backward direction 81B. Additionally, the brain control system 44 turns the motors 74R and 74L into generators when the hybrid remote control lawn mower is coasting down a hill or slowing down. In this mode of operation, the electric power generated by the motors 74R and 74L is stored in the battery 36. This electric power stored in the battery 36 may be used to provide power to the motors 74R and 74L. Thus, energy is conserved and decreases the amount of fuel used by the engine 28.

Figure 10:
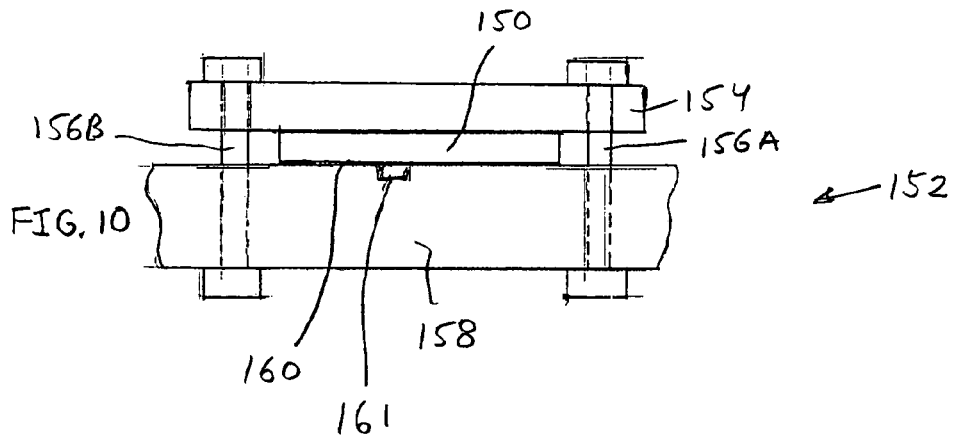
FIG. 10 illustrates a side view of a MOSFET cooling apparatus.

FIG. 9 illustrates MOSFETs 150A and 150B which provide control of electric current supplied to the left motor 74L. MOSFETs 150C and 150D provide control of electric current supplied to the right motor 74R. Electric current may cause overheating of the MOSFETs 150A, 150B, 150C and 150D. FIG. 10 illustrates a side view of a MOSFET 150 cooling apparatus 152. The cooling apparatus 152 includes a top clamping plate 154, a heat sink 158 and fasteners 156A and 156B. The MOSFET 150 is clamped between the top clamping plate 154 and the heat sink 158 by any suitable fasteners 156A and 156B (e.g., nuts and bolts, screws, etc.). The heat sink 158 may be any suitable material (e.g., aluminum, copper, etc.). A conductive grease 160 may be applied between the MOSFET 150 and the heat sink 158. The MOSFET 150 may be clamped with at least 10 newtons of force but preferably with about 150 newtons of force. The heat sink 158 may also include any other suitable means of cooling (e.g., fins, fan, liquid cooling, thermoelectric Peltier, etc.). The heat sink 158 carries heat away from the MOSFET 150 and enables the MOSFET 150 to carry large currents without failure. A temperature sensor 161 is attached to the MOSFET 150 to measure the MOSFET 150 temperature. Alternatively, the temperature sensor 161 may be attached to the heat sink 158 at a location near the MOSFET 150. The temperature sensor 161 may be any suitable temperature sensor (e.g., thermistor, thermocouple, RTD, etc.). If the temperature of the MOSFET 150 exceeds a predetermined temperature, the brain control system 44 shuts off the engine 28 and shuts off power to the motors 74R and 74L. The predetermined temperature may be but is not limited to about 60 degrees C. The brain control system 44 allows the engine 28 and motors 74R and 74L to restart and resume normal operation after the temperature of the MOSFET 150 lowers to a safe operating level.

Figure 11:
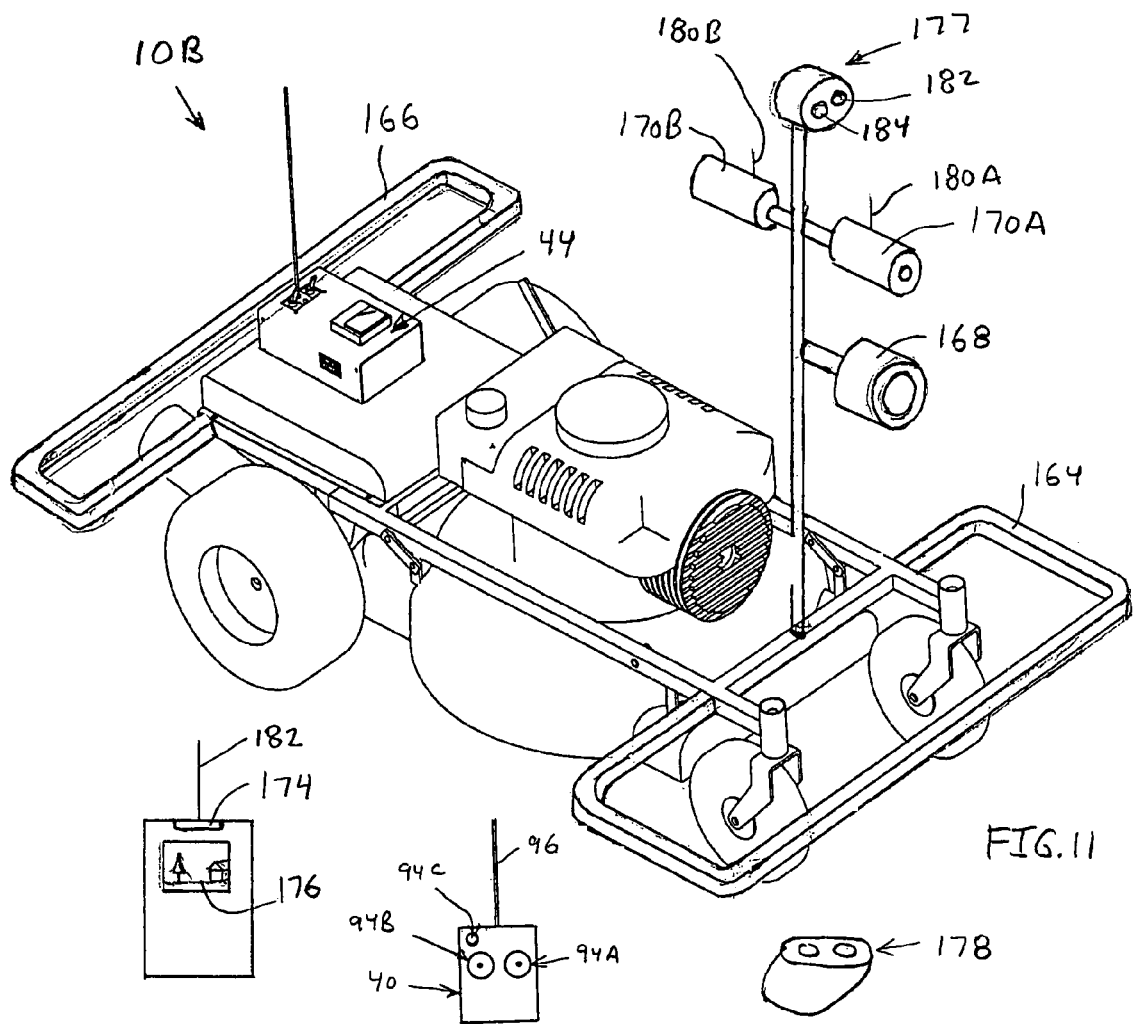
FIG. 11 illustrates a perspective view of another embodiment of a hybrid remote control lawn mower including a front bumper, a rear bumper, a headlight, wireless video cameras, a pattern recognition system, a wireless video receiver, and a virtual reality glasses apparatus.

FIG. 11 illustrates another embodiment of a hybrid remote control lawn mower 10B including a front bumper 164, a rear bumper 166, a headlight 168, a wireless video camera 170A, a wireless video camera 170B, a pattern recognition system 177, a wireless video receiver 174, a video display unit 176 and a virtual reality glasses apparatus 178. The operator inputs desired commands to the hybrid remote control lawn mower 10B through the remote transmitter apparatus 40.

If the front bumper 164 contacts an object, a signal is sent to the brain control system 44 and the brain control system 44 causes the hybrid remote control lawn mower 10B to stop moving. If the rear bumper 166 contacts an object, a signal is sent to the brain control system 44 and the brain control system 44 causes the hybrid remote control lawn mower 10B to stop moving.

The headlight 168 provides illumination at night. The wireless video cameras 170A and 170B provide views ahead and behind the hybrid remote control lawn mower 10B. The wireless video cameras 170A and 170B may be any suitable wireless video camera (e.g., 2.4 GHz, 5.8 GHz, infrared, color, etc.). The wireless video cameras 170A and 170B include antennas 180A and 180B respectively. The wireless video receiver 174 includes an antenna 182. The wireless video receiver 174 may be located at a remote distance from the wireless video cameras 170A and 170B. The wireless video cameras 170A and 170B send video signals through the antennas 180A and 180B. The antenna 182 of the wireless video receiver 174, receives the video signals from the antennas 180A and 180B. The videos from video cameras 170A and 170B are then displayed on the video display unit 176. Each video signal from camera 170A and 170B may be displayed and observed by the operator while the operator controls the hybrid remote control lawn mower 10B using the remote transmitter apparatus 40. Optionally, the video signals from the wireless video cameras 170A and 170B may be displayed and observed by the operator using a virtual reality glasses apparatus 178. The operator wears the virtual reality glasses apparatus 178 like a pair of eyeglasses and can see the video views.

The pattern recognition system 177 (FIG. 11) includes viewing devices 182 and 184. The pattern recognition apparatus 177 may swivel to look ahead of or behind the hybrid remote control lawn mower 10B. The brain control system 44 processes the signals from the viewing devices 182 and 184 and learns the locations of significant objects in a yard (e.g., houses, trees, bushes, etc.). The brain control system 44 then prevents the hybrid remote control lawn mower 10B from contacting these objects.

Figure 12:
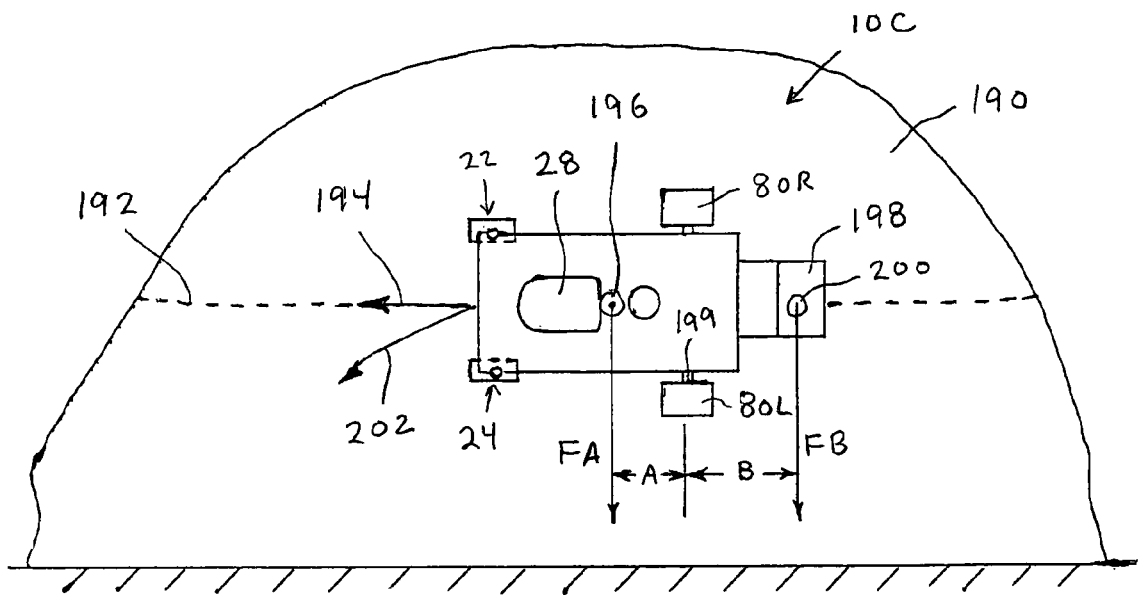
FIG. 12 illustrates a side view of a hill with another embodiment of the hybrid remote control lawn mower wherein the hybrid remote control lawn mower includes a counterweight apparatus.

FIG. 12 illustrates a side view of a hill 190 with another embodiment of a hybrid remote control lawn mower 10C. FIG. 12 illustrates the hybrid remote control lawn mower 10C following a contour line 192 (shown as dashed line) of the hill 190. A desired direction of travel is shown by direction arrow 194. FIG. 12 illustrates a center of gravity location 196 of the hybrid remote control lawn mower 10C. The center of gravity location 196 is located at a distance "A" in front of a center 199 of the left rear wheel 80L. A counterweight assembly 198 is attached to the frame 12 of the hybrid remote control lawn mower 10C. FIG. 12 illustrates a center of gravity location 200 of the counter weight assembly 198 and mass of the hybrid remote control lawn mower 10C behind the left rear wheel 80L. The center of gravity of the counter weight assembly 198 and mass of the hybrid remote control lawn mower 10C behind the left rear wheel 80L is located at a distance "B" behind the center 199 of the left rear wheel 80L. A force "FA" due to the weight of the hybrid remote control lawn mower 10C ahead of the left rear wheel 80L acts through the center of gravity location 196. A force "FB" due to the weight of the counter weight assembly 198 and the mass of the hybrid remote control lawn mower 10C acts through the center of gravity of location 198. If the moment due to the force "FA" multiplied by the distance "A" is larger than the moment due to the force "FB" multiplied by the distance "B", then the hybrid remote control lawn mower 10C will travel along a path indicated by direction arrow 202 (FIG. 12). If the moment due to force "FA" multiplied by the distance "A" is significantly larger than the moment due to the force "FB" multiplied by the distance "B", the hybrid remote control lawn mower 10C will not be able to follow the desired direction of travel 194 along the contour line 192. Mass is added to the counter weight assembly 198 until the moment due to the force "FA" multiplied by the distance "A" and the force "FB" multiplied by the distance "B" are about equal. Then the hybrid remote control lawn mower 10C will be able to follow the desired direction of travel 194 along the contour line 192.

Figure 13:
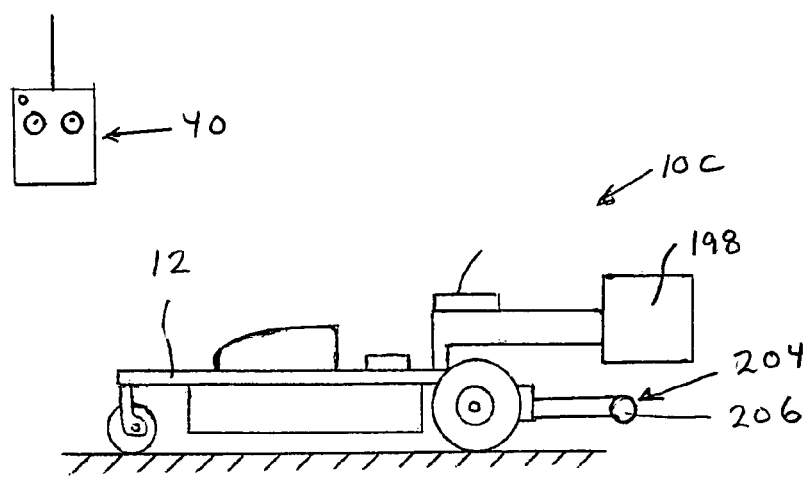
FIG. 13 illustrates a side view of the hybrid remote control lawn mower wherein the hybrid remote control lawn mower includes the counterweight apparatus of FIG. 12 and an anti-tipping assembly to prevent tipping over of the hybrid remote control lawn mower.

FIG. 13 illustrates the hybrid remote control lawn mower 10C including the counterweight assembly 198 and a anti-tipping assembly 204. The anti-tipping assembly 204 is attached to the frame 12 of the hybrid remote control lawn mower 10C. The anti-tipping assembly 204 includes a skid 206. The operator inputs desired commands to the remote control lawn mower 10C through the remote transmitter apparatus 40.

Figure 14:
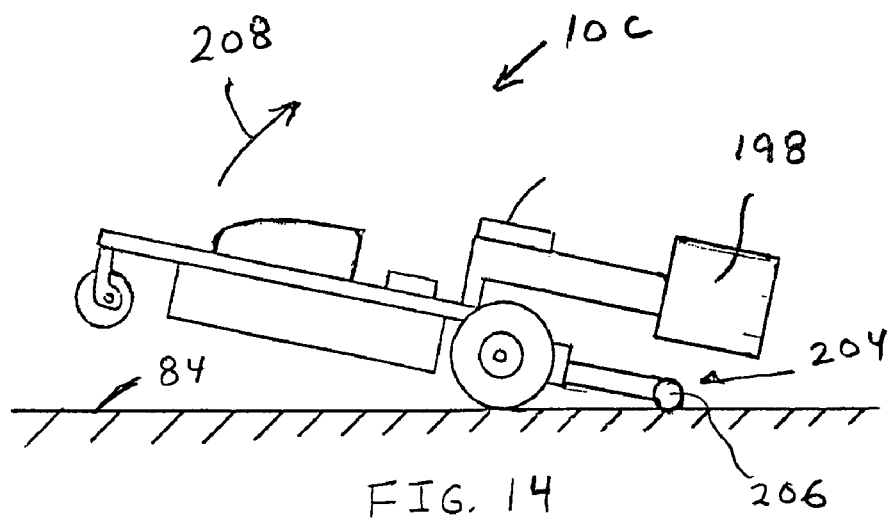
FIG. 14 illustrates a side view of the hybrid remote control lawn mower of FIG. 13, wherein the anti-tipping assembly is preventing the hybrid remote control lawn mower from tipping over.

FIG. 14 illustrates how the anti-tipping assembly 204 prevents the hybrid remote control lawn mower 10C from flipping over in a backwards direction (direction arrow 208). The skid 206 contacts and pushes against the support surface 84 and prevents the hybrid remote control lawn mower 10C from flipping over in the backwards direction (direction arrow 208).

Figure 15:
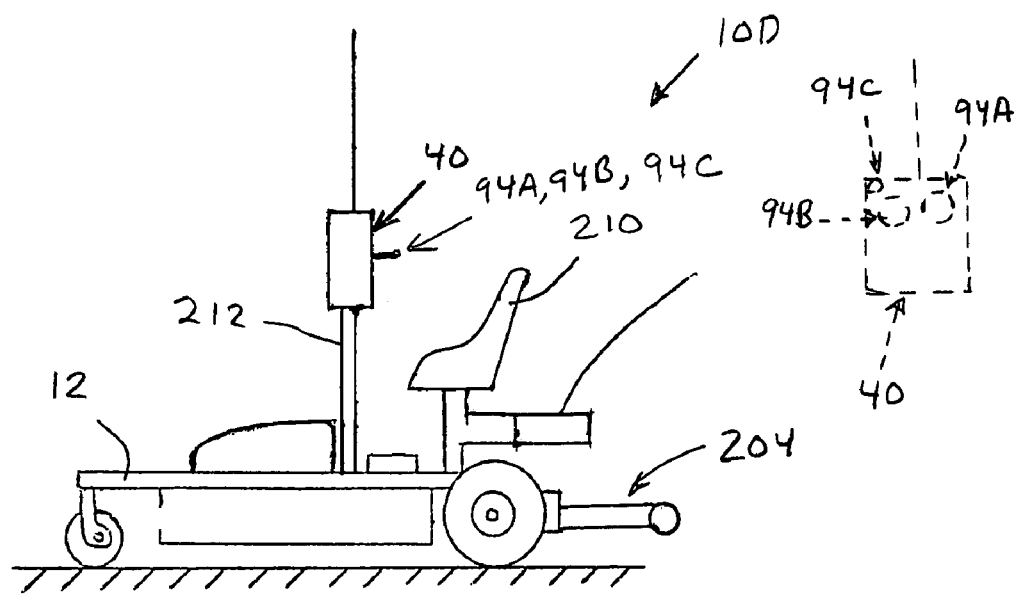
FIG. 15 illustrates a side view of another embodiment of a hybrid remote control lawn mower, wherein the hybrid remote control lawn mower includes a seat assembly for an operator and a transmitter support assembly to secure the remote transmitter apparatus of FIG. 7 to the hybrid remote control lawn mower.

FIG. 15 illustrates a side view of another embodiment of a hybrid remote control lawn mower 10D. The hybrid remote control lawn mower 10D includes a seat assembly 210, the anti-tipping assembly 204 and a remote transmitter support assembly 212. The seat assembly 210 is attached to the frame 12 of the hybrid remote control lawn mower 10D. An operator (not shown) may sit on the seat assembly 210. The remote transmitter support assembly 212 is attached to the frame 12 of the hybrid remote control lawn mower 10D. The remote transmitter apparatus 40 is removably attached to the remote transmitter support assembly 212. When the remote transmitter apparatus 40 is attached to the remote transmitter support assembly 212, the operator may sit on the seat assembly 210 and operate the hybrid remote control lawn mower 10D using the input control modules 94A, 94B and 94C of the remote transmitter apparatus 40. As a safety precaution, when mowing on a steep incline or hill, the operator may get off of the hybrid remote control lawn mower 10D and remove the remote transmitter apparatus 40 from the remote transmitter support assembly 212. Next, the operator may carry the remote transmitter apparatus 40 (shown in dashed lines) to a safe distance away from the hybrid remote control lawn mower 10D. Then the operator can use the input control modules 94A, 94B and 94C of the remote transmitter apparatus 40 to operate the hybrid remote control lawn mower on the steep incline or hill. Then in case the hybrid remote control lawn mower 10D slips down the hill, the operator is at a safe distance away from the unit and has no risk of falling off of the hybrid remote control lawn mower 10D.

Figure 16:
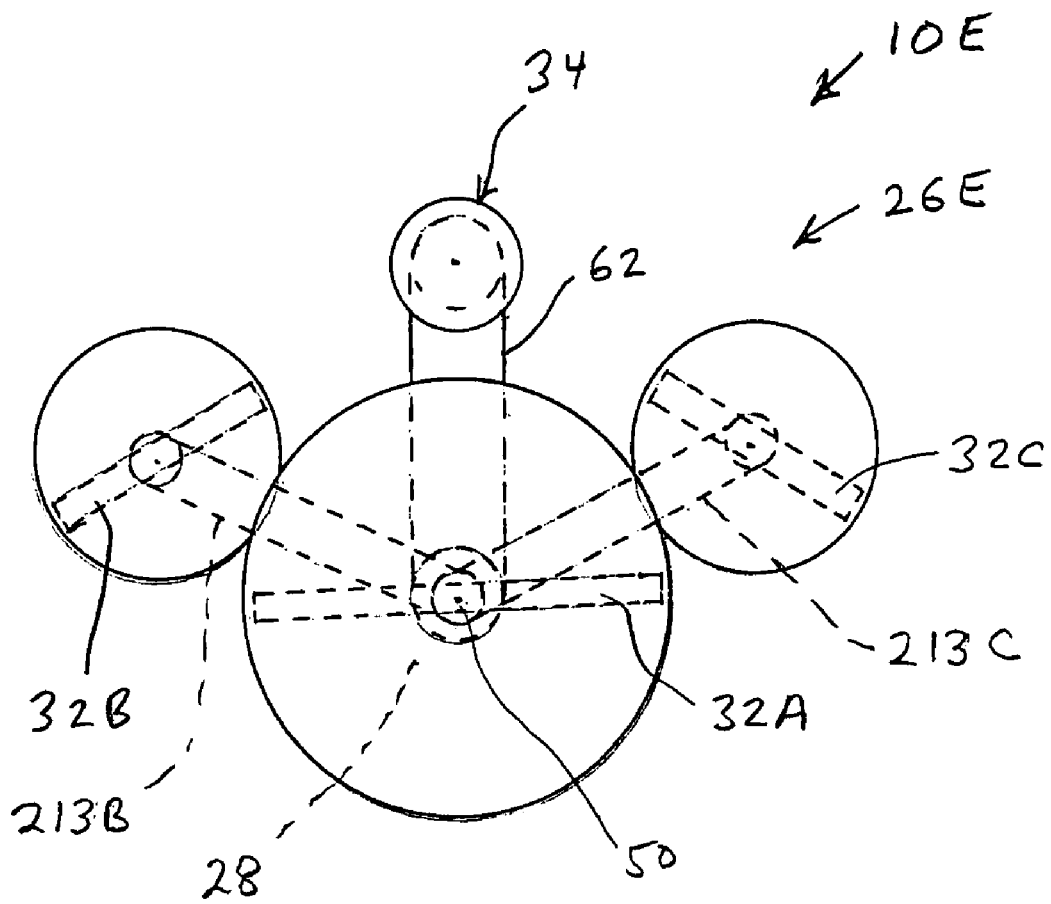
FIG. 16 illustrates a plan view of another embodiment of a hybrid remote control lawn mower including a deck apparatus including more than one lawn mower blade.

FIG. 16 illustrates a plan view of another embodiment of a hybrid remote control lawn mower 10E. The hybrid remote control lawn mower 10E includes a deck apparatus 26E. The deck apparatus 26E includes a plurality of lawn mower blades 32A, 32B and 32C. The lawn mower blades 32B and 32C are rotatably connected with the drive shaft 50 of the engine 28 (not shown). The lawn mower blade 32A is directly attached to the rotating drive shaft 50. Any suitable means of connection (e.g., belts, gears, etc.) may be used to rotatably connect the lawn mower blades 32B and 32C to the shaft 50 of the engine 28. For illustration purposes, belts 213B and 213C are shown connecting the lawn mower blades 32B and 32C to the rotating shaft 50. The drive belt 62 is shown connecting the alternator assembly 34 with the rotating drive shaft 50 of the engine 28.

Figure 17:
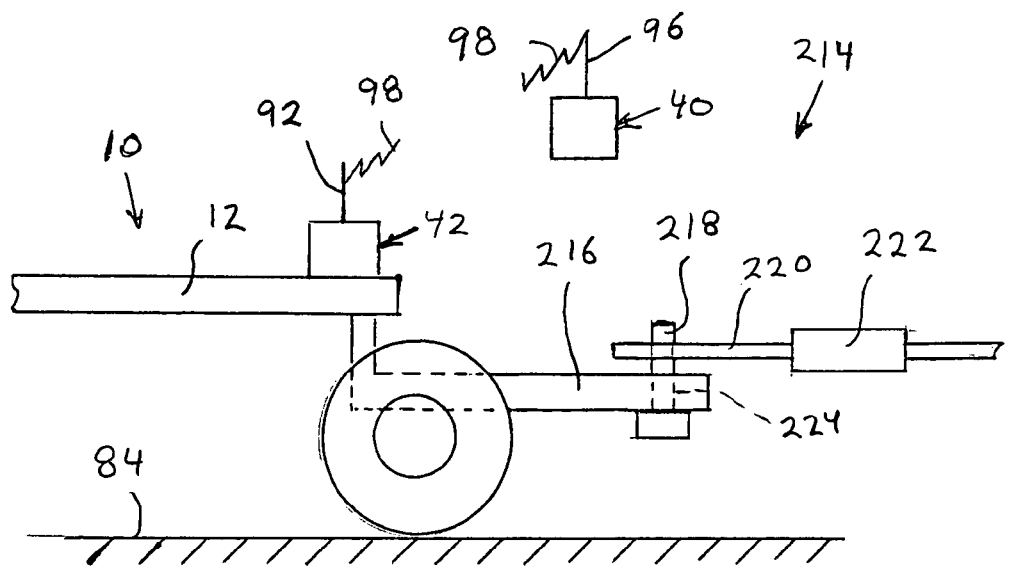
FIG. 17 illustrates a side view of a hitch assembly attached to the hybrid remote control lawn mower.

FIG. 17 illustrates a side view of a hitch assembly 214 attached to the hybrid remote control lawn mower 10. The hitch assembly 214 includes a hitch support arm 216, a hitch pin 218 and a tow bar 220. The hitch support arm 216 is attached to the frame 12 of the hybrid remote control lawn mower 10. The hitch support arm 216 includes a mounting hole 224. The hitch pin 218 passes through the mounting hole 224. The hitch pin may be any suitable form (e.g., hitch ball, straight pin, etc.). It was discovered that hitching the metallic tow bar 220 to the metallic frame 12 and to the metallic hitch pin 218 and to the metallic hitch support arm 216 would create radio wave signal 98 interference between the remote transmitter apparatus 40 and the receiver apparatus 42. To solve this interference problem it was discovered that electrical insulation must be provided somewhere in the path between the hitch support arm 216 and the tow bar 220. One solution is to provide electrical insulation between the hitch support arm 216 and the hitch pin 218. This insulation may include any suitable material (e.g., ceramic, acetal resin plastic, nylon, polyethylene, etc.). Another solution is to have the hitch pin 218 made from an electrical insulation material. The insulation material may include any suitable material (e.g., ceramic, acetal resin plastic, polyethylene, etc.). Another solution is to have the tow bar 220 include an insulation portion 222. This insulation portion 222 may include any suitable material (e.g., wood, fiberglass, polyethylene, etc.).

Figure 18:
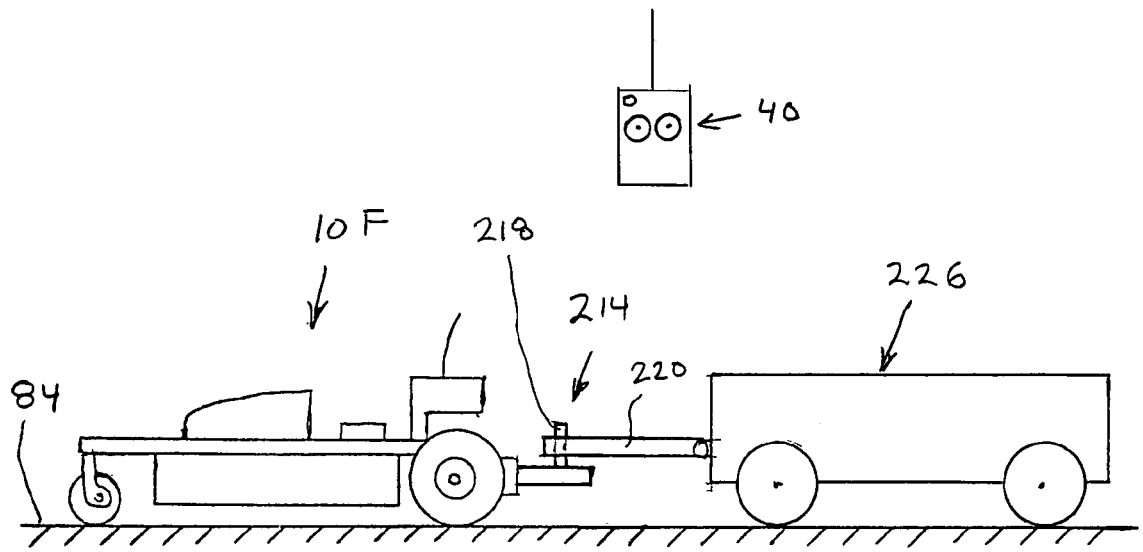
FIG. 18 illustrates a side view of another embodiment of a hybrid remote control lawn mower, wherein a wagon apparatus is coupled to the hybrid remote control lawn mower.

FIG. 18 illustrates a side view of another embodiment of a hybrid remote control lawn mower 10F. The hybrid remote control lawn mower 10F includes the hitch assembly 214 and a wagon apparatus 226 connected to the hybrid remote control lawn mower 10F. The wagon apparatus 226 may be used to carry any suitable material (e.g., dirt, sand, plants, etc.). The tow bar 220 of the wagon apparatus 226 may be demountably connected to the hitch pin 218 of the hitch assembly 214. The hybrid remote control lawn mower 10F may pull or push the wagon apparatus 226 along the support surface 84. The operator inputs desired commands to the remote control lawn mower 10F through the remote transmitter apparatus 40.

Figure 19:
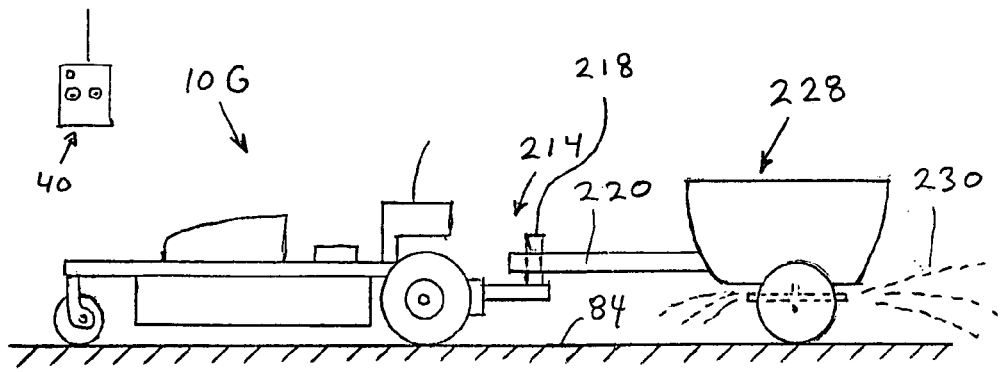
FIG. 19 illustrates a side view of another embodiment of a hybrid remote control lawn mower, wherein a spreader apparatus is connected to the hybrid remote control lawn mower.

FIG. 19 illustrates a side view of another embodiment of a hybrid remote control lawn mower 10G. The hybrid remote control lawn mower 10G includes the hitch assembly 214 and a spreader apparatus 228 connected to the hybrid remote control lawn mower 10G. The spreader apparatus 228 may be used to spread any suitable material 230 (e.g., fertilizer, seed, deice, etc.) upon the support surface 84. The tow bar 220 of the spreader apparatus 228 may be demountably connected to the hitch pin 218 of the hitch assembly 214. The hybrid remote control lawn mower 10G may pull the spreader apparatus 228 along the support surface 84. The operator inputs desired commands to the remote control lawn mower 10G through the remote transmitter apparatus 40.

Figure 20:
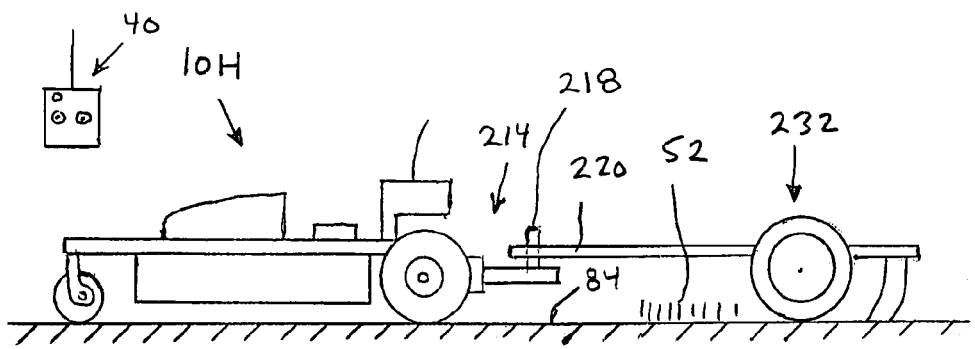
FIG. 20 illustrates a side view of another embodiment of a hybrid remote control lawn mower, wherein a dethatcher apparatus is connected to the hybrid remote control lawn mower.

FIG. 20 illustrates a side view of another embodiment of a hybrid remote control lawn mower 10H. The hybrid remote control lawn mower 10H includes the hitch assembly 214 and a dethatcher apparatus 232 connected to the hybrid remote control lawn mower 10H. The dethatcher apparatus 232 may be used to remove thatch from the lawn 52. The tow bar 220 of the dethatcher apparatus 232 may be demountably connected to the hitch pin 218 of the hitch assembly 214. The hybrid remote control lawn mower 10H may pull the dethatcher apparatus 232 along the support surface 84. The operator inputs desired commands to the remote control lawn mower 10H through the remote transmitter apparatus 40.

Figure 21:
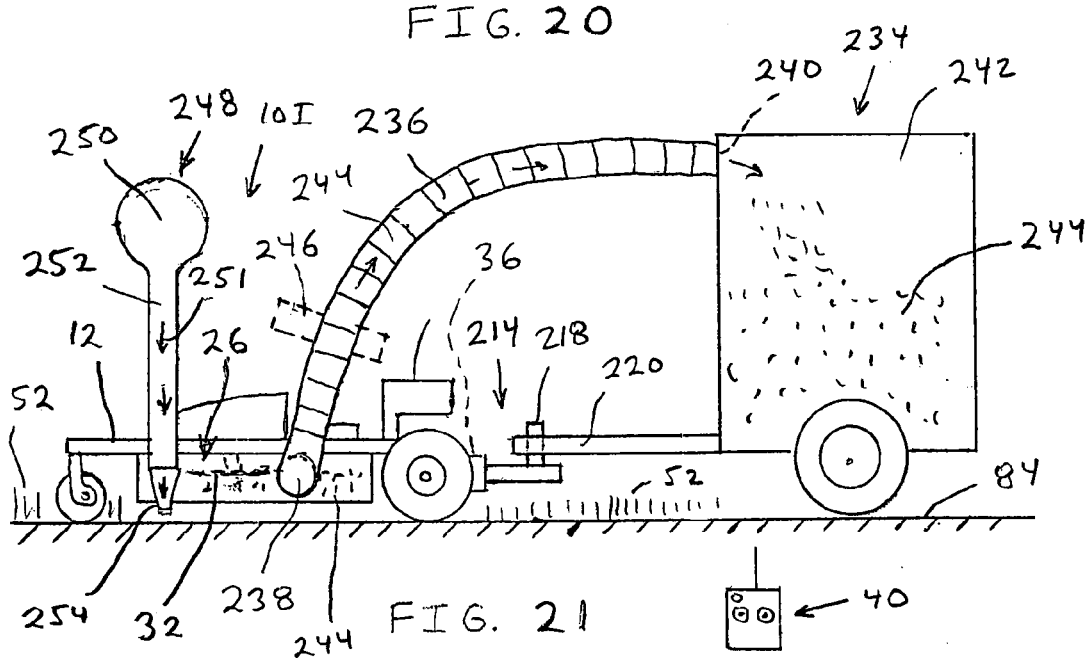
FIG. 21 illustrates a side view of another embodiment of a hybrid remote control lawn mower, wherein a lawn clippings collection apparatus is connected to the hybrid remote control lawn mower.

FIG. 21 illustrates a side view of another embodiment of a hybrid remote control lawn mower 10I. The hybrid remote control lawn mower 10I includes the hitch assembly 214 and a lawn clippings collector apparatus 234 connected to the hybrid remote control lawn mower 10I. The tow bar 220 of the lawn clippings collector apparatus 234 may be demountably connected to the hitch pin 218 of the hitch assembly 214. A lawn clippings conduit 236 connects a lawn exhaust port 238 with a lawn clippings collector port 240. The lawn exhaust port 238 is an opening in the deck apparatus 26. The lawn clippings collector port 240 is an opening in the side of a collection bin 242. Ground up lawn clippings 244 are blown through the lawn exhaust port 238, through the lawn clippings conduit 236 and through the lawn clippings collector port 240 into the collection bin 242. The lawn mower blade 32 chops up the lawn 52 into ground up lawn clippings 244 and the air pressure built up in the deck apparatus 26 blows the ground up lawn clippings 244 from the deck apparatus 26, through the lawn clippings conduit 236 and into the collection bin 242. Optionally, a supplemental air blower device 246 (shown in dotted lines) may be added to provide additional air flow to blow the lawn clippings 244 up through the lawn clippings conduit 236 into the collection bin 242. The hybrid remote control lawn mower 10I pulls the lawn clippings collector apparatus 234 along the support surface 84. Use of the hybrid remote control lawn mower 10I with the lawn clippings collector apparatus 234 is not limited to lawn clippings but may be used in a similar manner for grinding up and collecting leaves. The operator inputs desired commands to the remote control lawn mower 10I through the remote transmitter apparatus 40.

Another embodiment of the hybrid remote control lawn mower 10I including a leaf blower apparatus 248 is illustrated in FIG. 21. The leaf blower apparatus 248 may be demountably attached to the frame 12 of the hybrid remote control lawn mower 10I. The leaf blower apparatus 248 includes a blower 250, a conduit 252 and an exhaust nozzle 254. The blower 250 provides pressurized air 251. The pressurized air 251 flows through the conduit 252 and ejects from the exhaust nozzle 254 onto the support surface 84. The blower 250 may include any suitable power means including an internal combustion engine or an electric motor. The electric motor may be powered by the battery 36 of the hybrid remote control lawn mower 10I. The pressurized air ejecting from the exhaust nozzle 254 of the leaf blower apparatus 248 may be used to blow lawn clippings 244 or leaves from a support surface 84. While the leaf blower apparatus 248 is operating the hybrid remote control lawn mower 10I may be controlled to travel along any desired path while the leaf blower apparatus blows lawn clippings 244 or leaves away from the support surface 84. The operator inputs desired commands to the hybrid remote control lawn mower 10I through the remote transmitter apparatus 40. These commands may include turning on and off the blower 250 of the leaf blower apparatus 248.

Figure 22:
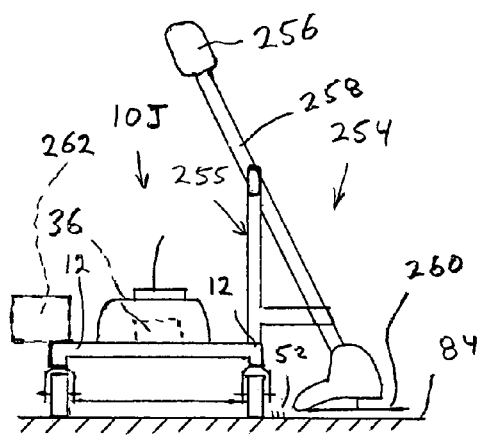
FIG. 22 illustrates a front view of another embodiment of a hybrid remote control lawn mower, wherein a weed trimmer apparatus is attached to the hybrid remote control lawn mower.
Figure 23:
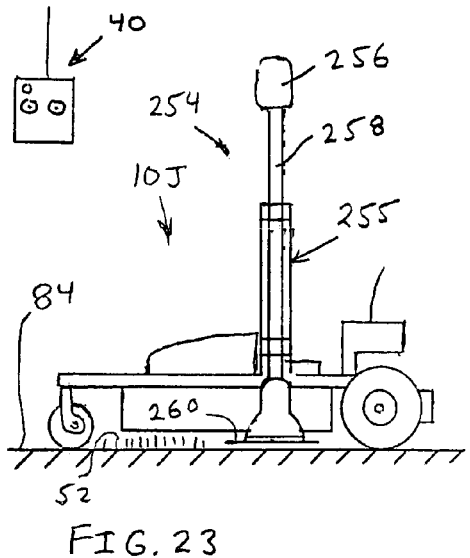
FIG. 23 illustrates a side view of the hybrid remote control lawn mower including the weed trimmer apparatus of FIG. 22.

FIG. 22 illustrates a front view of another embodiment of a hybrid remote control lawn mower 10J. The hybrid remote control lawn mower 10J includes a support frame apparatus 255 and a weed trimmer apparatus 254. The support frame apparatus 255 is attached to the frame 12 of the hybrid remote control lawn mower 10J. The weed trimmer apparatus 254 may be demountably attached to the support frame apparatus 255. The weed trimmer apparatus 254 includes a motor 256, a drive shaft 258 and a trimmer blade 260. The motor 256 spins the drive shaft 258 which spins the trimmer blade 260. The trimmer blade 260 is positioned to trim lawn 52. The trimmer blade 260 may be any suitable cutting blade (e.g., string cutter, metallic blade, etc.). The motor 256 may be any suitable motor (e.g., gasoline, electric, etc.). The electric motor may be powered by the battery 36 of the remote control lawn mower 10J. While the weed trimmer apparatus 254 is operating, the hybrid remote control lawn mower 10I may be controlled to travel along any desired path while the weed trimmer apparatus 254 trims the lawn 52 or weeds. Optionally, a counter balance weight 262 (shown with dotted lines) may be demountably attached to the support frame 12. The counter balance weight 262 may be used to counterbalance the weight of the weed trimmer apparatus 254 to prevent the hybrid remote control lawn mower 10J from tipping. FIG. 23 illustrates a side view of the weed trimmer apparatus 254 demountably attached to the support frame apparatus 255. The operator inputs desired commands to the hybrid remote control lawn mower 10J through the remote transmitter apparatus 40. These commands may include turning on and off the motor 256 of the weed trimmer apparatus 254.

Figure 24:
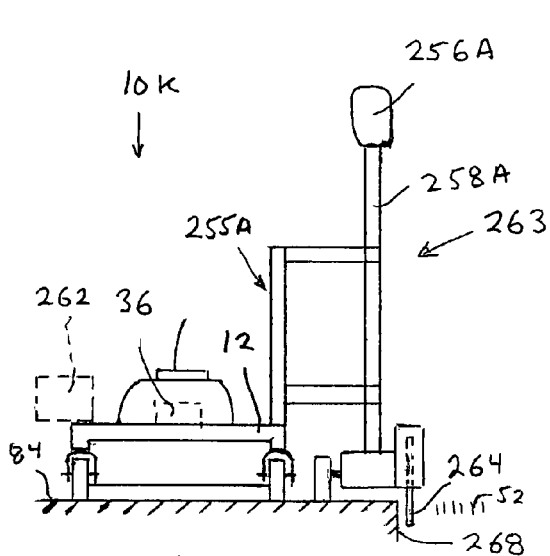
FIG. 24 illustrates a front view of another embodiment of a hybrid remote control lawn mower, wherein an edge trimmer apparatus is attached to the hybrid remote control lawn mower.
Figure 25:
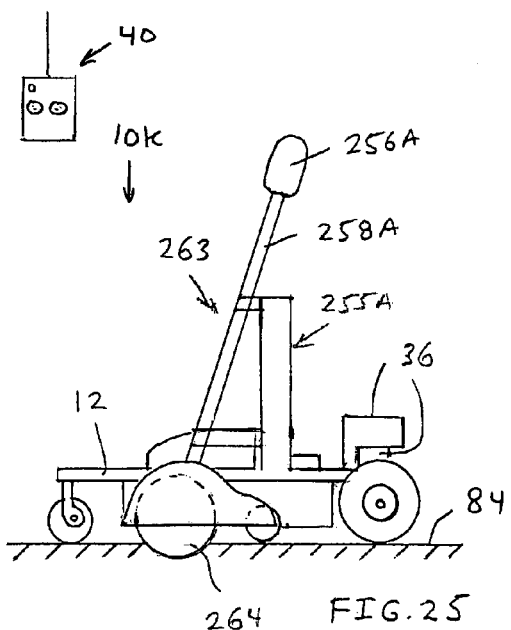
FIG. 25 illustrates a side view of the hybrid remote control lawn mower including the edge trimmer of FIG. 24.

FIG. 24 illustrates a front view of another embodiment of a hybrid remote control lawn mower 10K. The hybrid remote control lawn mower 10K includes a support frame apparatus 255A and an edge trimmer apparatus 263. The support frame apparatus 255A is attached to the frame 12 of the remote control lawn mower 10K. The edge trimmer apparatus 263 may be demountably attached to the support frame apparatus 255A. The edge trimmer apparatus 263 includes a motor 256A, a drive shaft 258A and an edger blade 264. The motor 256A spins the drive shaft 258A which spins the edger blade 264. The edger blade 264 is positioned to trim lawn 52 at an edge of a walkway 268. The edger blade 264 may be any suitable cutting blade (e.g., string cutter, metallic blade, etc.). The motor 256A may be any suitable motor (e.g., gasoline, electric, etc.). The electric motor may be powered by the battery 36 of the hybrid remote control lawn mower 10K. While the edger apparatus 263 is operating, the hybrid remote control lawn mower 10K may be controlled to travel along any desired path while the edger trimmer apparatus 263 trims the lawn 52 or weeds along the edge of the walkway 268. Optionally, the counter balance weight 262 (shown with dotted lines) may be demountably attached to the support frame 12. The counter balance weight 262 may be used to counterbalance the weight of the edge trimmer apparatus 263 to prevent the remote control lawn mower 10K from tipping. FIG. 25 illustrates a side view of the edge trimmer apparatus 263 demountably attached to the support frame apparatus 255. The operator inputs desired commands to the hybrid remote control lawn mower 10K through the remote transmitter apparatus 40. These commands may include turning on and off the motor 256A of the edge trimmer apparatus 263.

Figure 26:
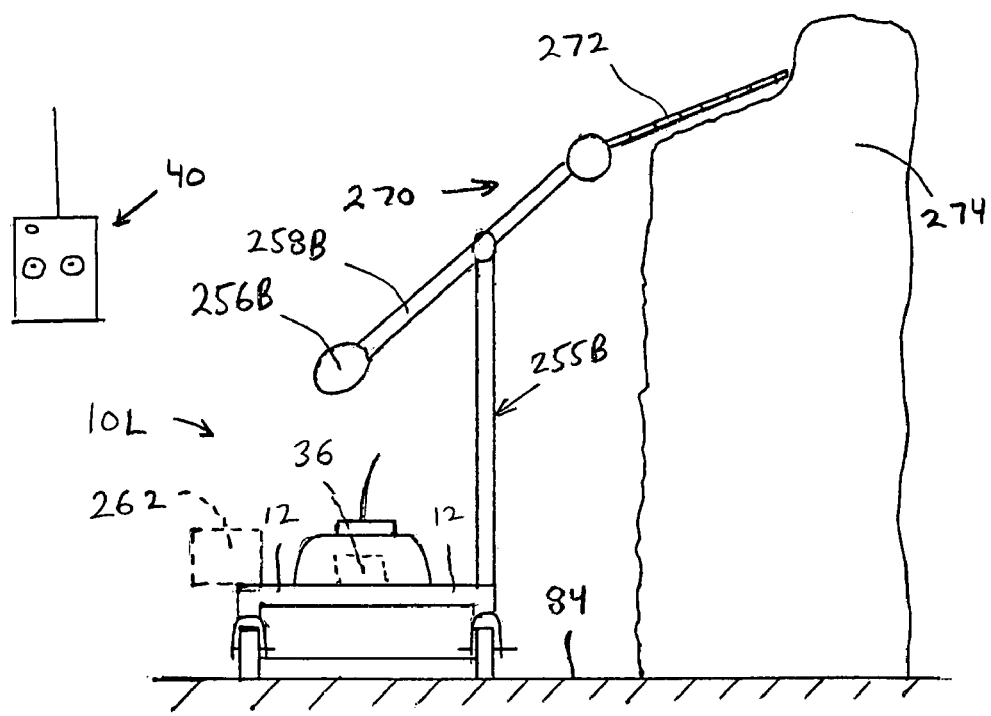
FIG. 26 illustrates a front view of another embodiment of a hybrid remote control lawn mower, wherein a hedge trimmer apparatus is attached to the hybrid remote control lawn mower.

FIG. 26 illustrates a front view of another embodiment of a hybrid remote control lawn mower 10L. The hybrid remote control lawn mower 10L includes a support frame apparatus 255B and a hedge trimmer apparatus 270. The support frame apparatus 255B is attached to frame 12 of the hybrid remote control lawn mower 10L. The hedge trimmer apparatus 270 may be demountably attached to the support frame apparatus 255B. The hedge trimmer apparatus 270 includes a motor 256B, a drive shaft 258B and a hedge trimmer blade 272. The motor 256B spins the drive shaft 258B which drives the hedge trimmer blade 272. The hedge trimmer blade 272 is positioned to trim a hedge 274. The hedge trimmer blade 272 may be any suitable blade (e.g., single sided, double sided, etc.). The motor 256B may be any suitable motor (e.g., gasoline, electric, etc.). The electric motor may be powered by the battery 36 of the hybrid remote control lawn mower 10L. While the hedge trimmer apparatus 270 is operating, the hybrid remote control lawn mower 10L may be controlled to travel along any desired path along the surface 84 while the hedge trimmer blade 272 is cutting along the hedge 274. Optionally, the counter balance 262 may be demountably attached to the support frame 12. The counter balance weight 262 may be used to counter balance the weight of the hedge trimmer apparatus 270 to prevent the hybrid remote control lawn mower 10K from tipping. The operator inputs desired commands to the hybrid remote control lawn mower 10L through the remote transmitter apparatus 40.

Figure 27:
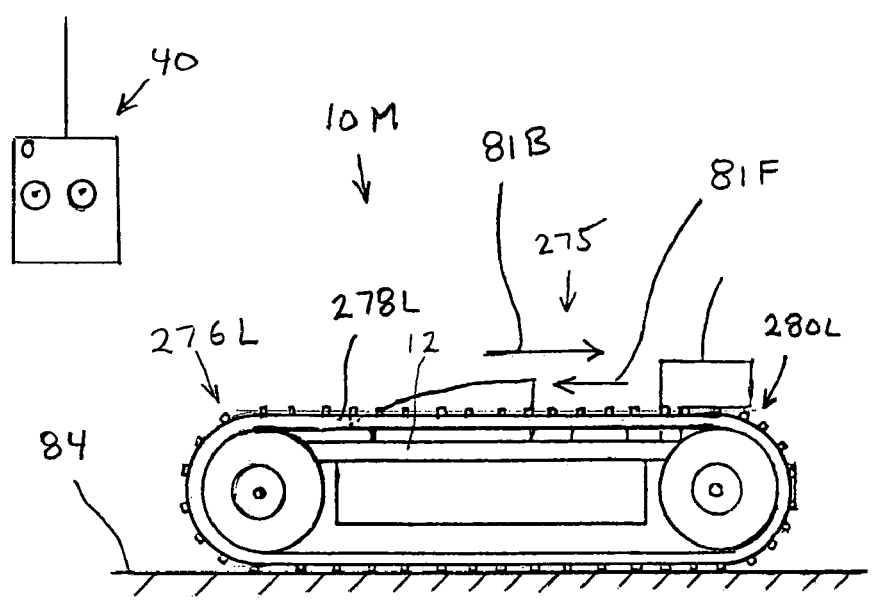
FIG. 27 illustrates a side view of another embodiment of a hybrid remote control lawn mower, wherein a track apparatus provides movement upon a support surface.
Figure 28:
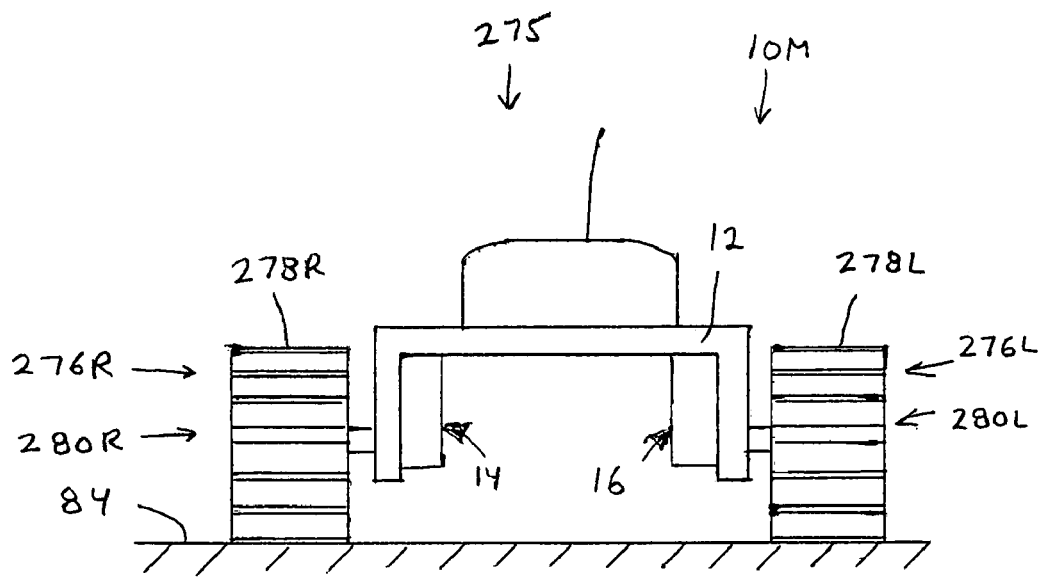
FIG. 28 illustrates a front view of the hybrid remote control lawn mower of FIG. 27.

FIGS. 27 and 28 illustrate another embodiment of a hybrid remote control lawn mower 10M. FIG. 27 illustrates a side view of the hybrid remote control lawn mower 10M. FIG. 28 illustrates a front view of the hybrid remote control lawn mower 10M. The hybrid remote control lawn mower 10M includes a track drive apparatus 275. The track drive apparatus 275 includes a left front wheel assembly 276L, a left track 278L, a left rear drive wheel assembly 280L, a right front wheel assembly 276R, a right track 278R and a right rear wheel drive assembly 280R. As illustrated in FIG. 27, the left front wheel assembly 276L is attached to the frame 12 of the hybrid remote control lawn mower 10M. The left rear drive wheel assembly 280L is connected with the left rear motor apparatus 16. The left track 278L couples the left rear drive wheel assembly 280L with the left front wheel assembly 276L. As illustrated in FIG. 28, the right front wheel assembly 276R is attached to the frame 12 of the hybrid remote control lawn mower 10M. The right rear drive wheel assembly 280R is connected with the right rear motor apparatus 14. The right track 278R couples the right rear drive wheel assembly 280R with the right front wheel assembly 276R. In a similar manner as described in the remote control lawn mower 10 (FIGS. 1-5) the right rear motor apparatus 14 may drive the right rear drive wheel assembly 280R in a forward (direction arrow 81F) or in a backwards direction (direction arrow 81B). The left rear motor apparatus 16 may drive the left rear drive wheel assembly 280L in the forward (direction arrow 81F) or in the backwards direction (direction arrow 81B). To travel in the forward direction 81F the right rear drive wheel assembly 280R and the left rear drive wheel assembly 280L rotate in the same forward direction 81F to provide forward movement to the hybrid remote control lawn mower 10M. To travel in a backward direction 81B the right rear drive wheel assembly 280R and the left rear drive wheel assembly 280L rotate in the same backward direction 81B. To travel in a straight line the right rear drive wheel assembly 280R and the left rear drive wheel assembly 280L rotate at the same speed. When traveling forward and turning right, the left rear drive wheel assembly 280L rotates faster than the right rear drive wheel assembly 280R. When traveling forward and turning left, the right rear drive wheel assembly 280R rotates faster than the left rear drive wheel assembly 280L. To provide zero turning radius to the right, the left rear drive wheel assembly 280L rotates in the forward direction 81F while the right rear wheel drive assembly 280R rotates in the backward direction 81B. To provide zero turning radius to the left, the right rear wheel drive assembly 280R rotates in the forward direction 81F and the left rear wheel drive assembly 280L rotates in the backward direction 81B. The operator inputs desired commands to the hybrid remote control lawn mower 10M through the remote transmitter apparatus 40.

Figure 29:
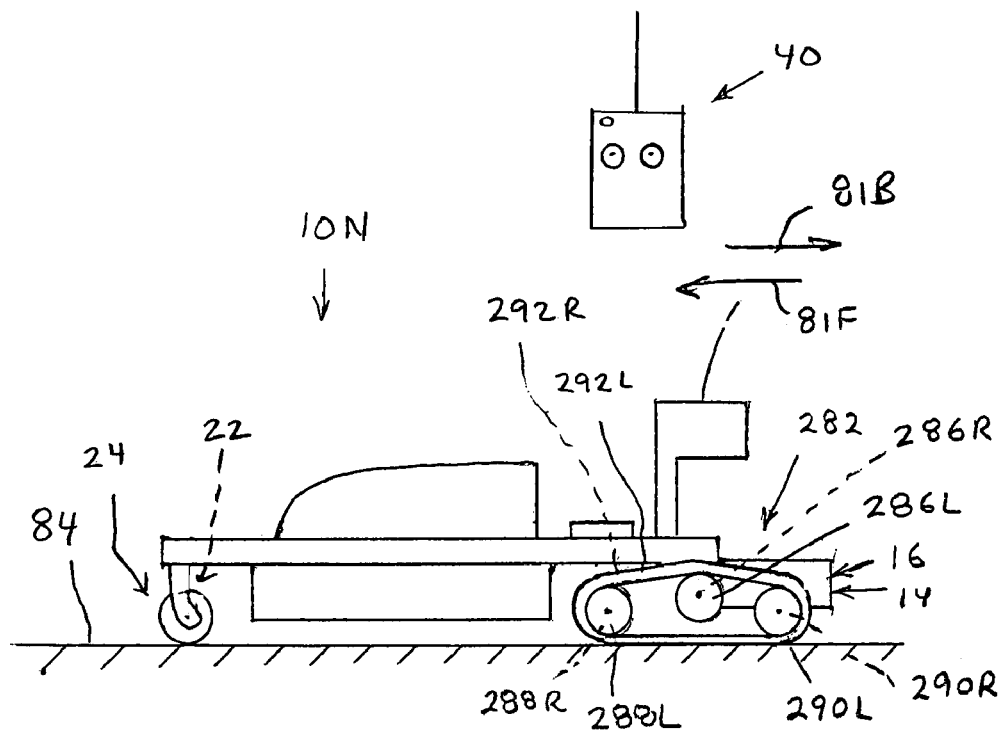
FIG. 29 illustrates a side view of another embodiment of a hybrid remote control lawn mower including a rear track drive apparatus.

FIG. 29 illustrates a side view of another embodiment of a hybrid remote control lawn mower 10N. The hybrid remote control lawn mower includes a left rear track drive apparatus 282L and a right rear track apparatus 282R. The left rear track drive apparatus 282L (FIG. 29) replaces the left rear wheel apparatus 20 (FIG. 1) of the embodiment of the hybrid remote control lawn mower 10. The right rear track drive apparatus 282R (FIG. 29) replaces the right rear wheel apparatus 18 (FIG. 1) of the first embodiment of the hybrid remote control lawn mower 10. The left rear track drive apparatus 282L includes a left rear track drive wheel 286L, a left rear idler wheel 288L, a left rear idler wheel 290L and a left rear track 292L. The right rear track drive apparatus 282R includes a right rear track drive wheel 286R, a right rear idler wheel 288R, a right rear idler wheel 290R and right rear track 292R. The left rear track drive wheel 286L is connected to the left rear motor apparatus 16. The right rear track drive wheel 286R is connected to the right rear motor apparatus 14. The left rear track 292L couples the left rear track drive wheel 286L with the left rear idler wheel 288L and the left rear idler wheel 290L. The left rear track 292L rests upon the support surface 84. The right rear track 292R couples the right rear track drive wheel 286R with the right rear idler wheel 288R and the right rear idler wheel 290R. The right rear track 292R rests upon the support surface 84. A forward direction (direction arrow 81F) and a backward direction (direction arrow 81B) are shown in FIG. 29. The left rear motor apparatus 16 may rotate the left rear track 292L in a forward 81F or backward direction 81B. The right rear motor apparatus 14 may rotate the right rear track 292R in a forward 81F or backward 81B direction. The left rear track 292L and the right rear track 292R provide forward and rear propulsion to the hybrid remote control lawn mower 10N. The hybrid remote control lawn mower 10M further includes the left front free swiveling wheel apparatus 24 and the right front swiveling wheel apparatus 22. Details of the left front free swiveling wheel apparatus 24 and the right front swiveling wheel apparatus 22 are shown in FIG. 1 and described in the previous description of the first embodiment of the hybrid remote control lawn mower 10. The hybrid remote control lawn mower 10N steers and operates in a similar manner as included in the description of the embodiment of the remote control lawn mower 10. The operator inputs desired commands to the hybrid remote control lawn mower 10N through the remote transmitter apparatus 40.

Figure 30:
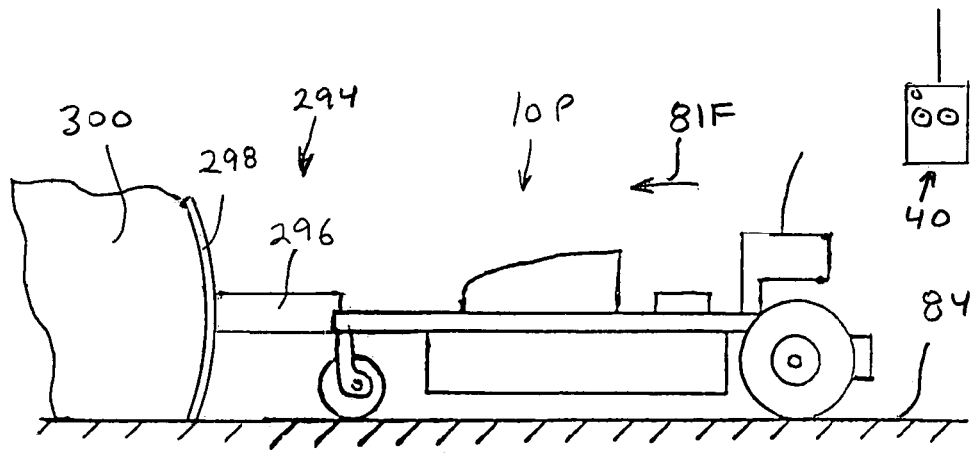
FIG. 30 illustrates a side view of another embodiment of a hybrid remote control lawn mower including a blade apparatus attached to the hybrid remote control lawn mower.

FIG. 30 illustrates a side view of another embodiment of a hybrid remote control lawn mower 10P. The hybrid remote control lawn mower 10P includes a blade apparatus 294. The blade apparatus 294 includes a mounting member 296 and a blade 298. The blade 298 is rigidly attached to the mounting member 298. The mounting member 298 may be demountably attached to the frame 12 of the hybrid remote control lawn mower 10P. The blade 298 may be any suitable shape (e.g., concave, flat, etc.). The blade 298 rests upon the support surface 84. The hybrid remote control lawn mower 10P pushes the blade 298 towards a pile of loose material 300 (e.g. snow, dirt, sand, etc.). When the hybrid remote control lawn mower 10P moves in the forward direction (direction arrow 81F), the blade pushes the loose material 300 in the forward direction 81F). In this manner the hybrid remote control lawn mower 10P may push loose material 300 to any desired location. The operator inputs desired commands to the hybrid remote control lawn mower 10N through the remote transmitter apparatus 40.

Figure 31:
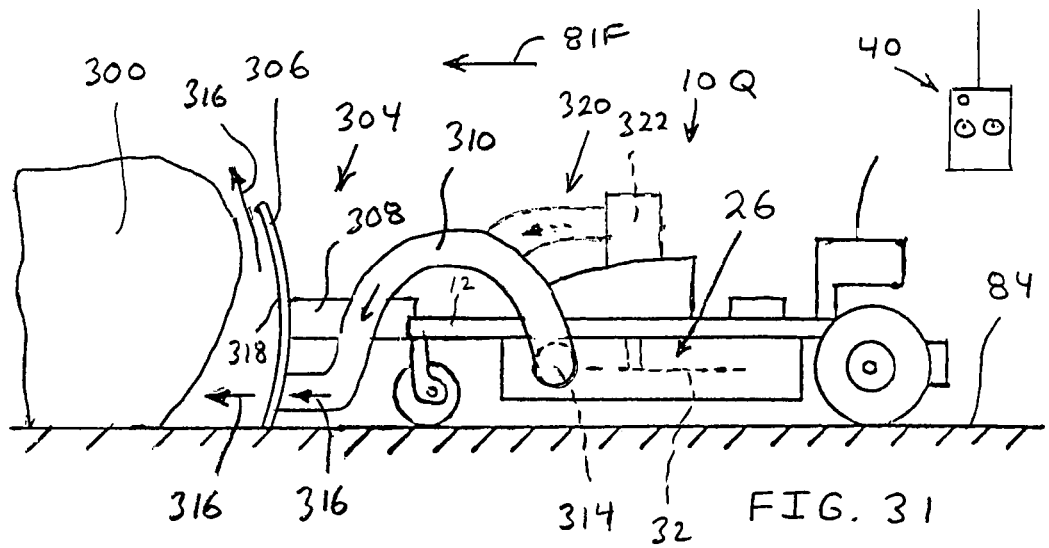
FIG. 31 illustrates a side view of another embodiment of a remote control lawn mower including a fluid blade apparatus.

FIG. 31 illustrates a side view of another embodiment of the hybrid remote control lawn mower 10Q. The hybrid remote control lawn mower 10Q includes a fluid blade apparatus 304. The fluid blade apparatus 304 includes a fluid blade 306, a mounting element 308 and a pressurized air conduit 310. The fluid blade 306 is rigidly attached to the mounting element 308. The mounting element 308 may be demountably attached to the frame 12 of the hybrid remote control lawn mower 10A.

Figure 32:
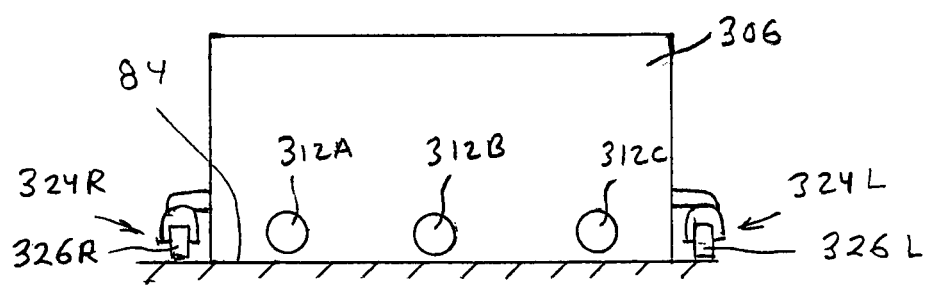
FIG. 32 illustrates a front view of the fluid blade apparatus of FIG. 31, including fluid exhaust ports.

The fluid blade 306 includes at least one fluid exhaust port 312A, 312B and 312C as illustrated in a front view FIG. 32 of the fluid blade 306. The deck apparatus 26 includes an air exhaust port 314. Pressurized air 316 is built up in the deck apparatus by the spinning lawn mower blade 32. The pressurized air conduit 310 connects the air exhaust port 314 with the at least one blade port 312A, 312B and 312C. Pressurized air 316 travels from the deck apparatus 42 through the air exhaust port 314, through the pressurized air conduit 310 and through the at least one fluid exhaust port 312A, 312B and 312C. The remote control lawn mower 10Q pushes the fluid blade apparatus 304 in the forward direction (direction arrow 81F) towards the pile of loose material 300 (e.g., snow, dirt, sand, leaves, etc.). The pressurized air 316 builds up between a front blade surface 318 and the pile of loose material 300. The pressurized air 316 reduces friction between the front blade surface 318 and the pile of loose material 300 and helps push the pile of loose material 300 in the forward direction 302. Optionally, a pressurized air source apparatus 320 (shown in dotted lines FIG. 31) may supply pressurized air 316 to the pressurized air conduit 310. The pressurized air source apparatus 320 may include any suitable power blower 322 (e.g., driven from the engine 28, electric motor, etc.).

As illustrated in FIG. 32 an optional set of wheel assemblies 324L and 324 R may be attached to the fluid blade 306. The wheel assembly 324L includes a wheel 326L. The wheel assembly 324R includes a wheel 326R. The wheels 326L and 326R roll along the support surface 84 and may support the fluid blade 306 slightly above the support surface 84, thereby reducing the friction between the support surface 84 and the fluid blade 306. The operator inputs desired commands to the hybrid remote control lawn mower 10P through the remote transmitter apparatus 40.

Figure 33:
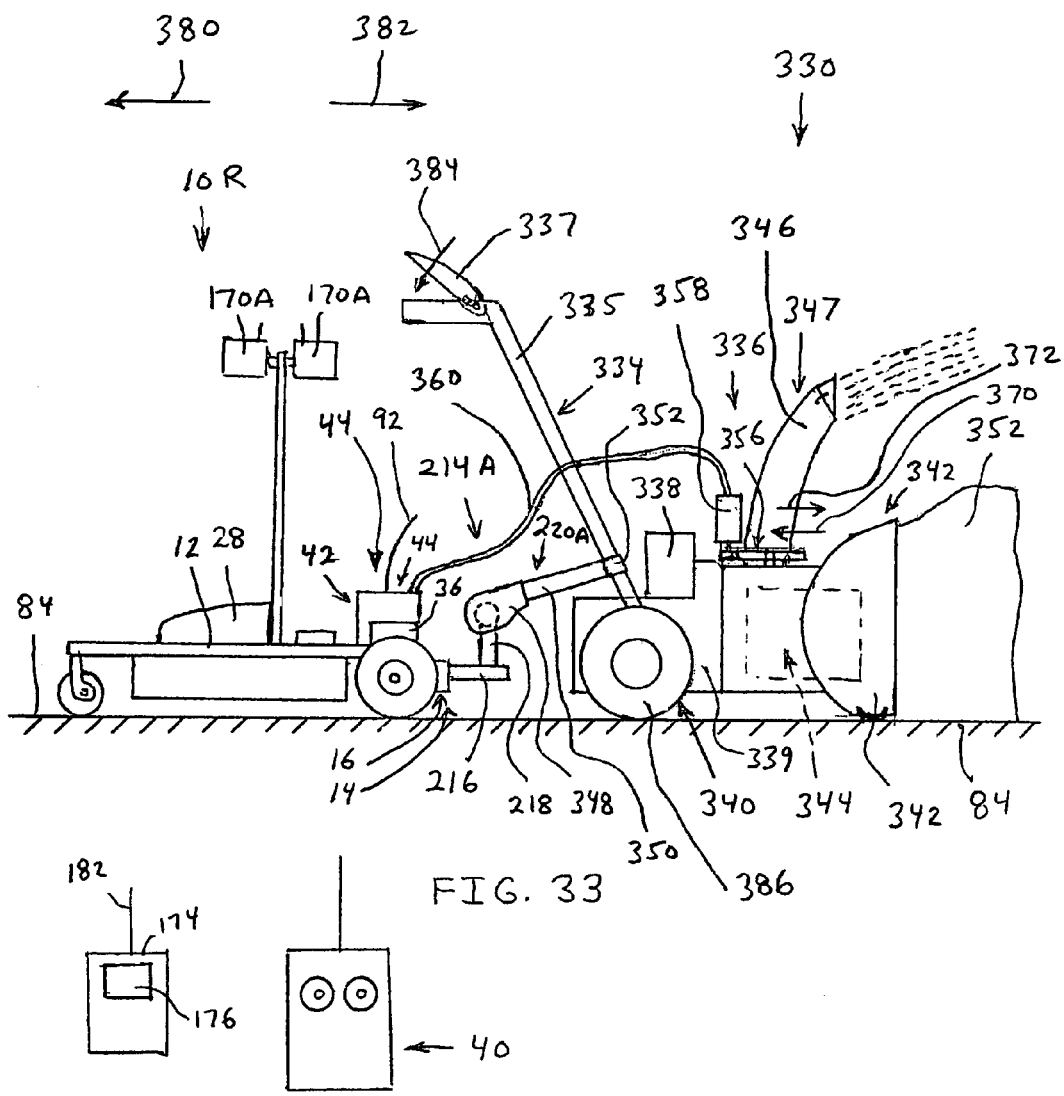
FIG. 33 illustrates a side view of another embodiment of a remote control lawn mower including a snow blower apparatus attached to the remote control lawn mower.

FIG. 33 illustrates a side view of another embodiment of a hybrid remote control lawn mower 10R. The hybrid remote control lawn mower 10R includes a snow blower apparatus 330. The snow blower apparatus 330 includes a tow bar apparatus 220A, a handle assembly 334 and a main body apparatus 336. The main body apparatus 336 includes a snow blower motor 338, a main housing 339, a drive wheel assembly 340, a front snow inlet section 342, a snow ejection apparatus 344 and a snow discharge chute apparatus 347. The handle assembly includes a main handle 335 and a blower control handle 337. The hybrid remote control lawn mower 10R includes a hitch assembly 214A. The hitch assembly 214A is similar to the hitch assembly 214 as shown in FIG. 17 and as previously described in the specification relating to FIG. 17. The hitch support arm 216 is attached to the frame 12 of the hybrid remote control lawn mower 10R. The hitch pin 218 is attached to the hitch support arm 216. The hitch pin 218 may be any suitable form (e.g., hitch ball, straight pin, etc.). The tow bar apparatus includes a hitch pin connector 348, a tow arm 350 and a clamp 352. The hitch pin connector 348 is rigidly attached to the tow arm 350. The clamp 352 is demountably attached to the main handle 335 of the handle assembly 334. The clamp 352 may include any suitable means of clamping (e.g., hose clamp, bolt and nut, etc.). Alternatively, the clamp 352 may be demountably attached to the main body housing 339 of the snow blower apparatus 330. The hitch pin connector 348 may be demountably attached to the hitch pin 218. As previously described, electrical insulation may be provided somewhere in the path between the hitch pin support arm 216 and the tow arm 350. This is described in the specification section relating to FIG. 17. The snow discharge chute apparatus 347 includes a snow outlet chute 346 and a chute rotation apparatus 356. The snow blower motor 338 provides power to the snow ejection apparatus 344. The snow blower motor 338 may include any suitable motor (e.g. gasoline, electric, diesel, etc.). The battery 36 in the hybrid remote control lawn mower 10R may provide power to an electric snow blower motor 338. The snow ejection apparatus 344 may include any suitable means of blowing snow (e.g., single stage impeller, dual stage auger with impeller, etc.). Snow 352 enters the front snow inlet section 342 and the snow ejection apparatus 344 blows the snow through the snow outlet chute 346. The chute rotation apparatus 356 provides a means of rotating the snow outlet chute 346 to blow snow in any selected direction (e.g., forward, to the right, to the left, etc.) away from the snow blower apparatus 330. The chute rotation apparatus 356 may include an electric chute motor 358 to rotate the snow outlet chute 346. The electric chute motor 358 is controlled by the brain control system 44. A cable 360 electrically connects the brain control system 44 with the electric chute motor 358. The brain control system 44 sends electrical signals to the electric chute motor 358 to enable the electric chute motor to rotate the snow outlet chute 346 in a desired direction. FIG. 7 illustrates a front view of the remote transmitter apparatus 40. If the operator pushes the input control stick 126 in an upward direction (direction arrow 362 FIG. 7), the snow outlet chute 346 will rotate in a clockwise direction (direction arrow 370 FIG. 33). If the operator pushes the input control stick 126 in a downward direction (direction arrow 366 FIG. 7), the snow outlet chute 346 will rotate in a counter clockwise direction (direction arrow 372 FIG. 33). If the operator releases the input control stick 126, the input control stick 126 returns to the center position 132 (FIG. 7) and the snow outlet chute 346 stops rotating. Optionally, the remote control lawn mower 10R may include the wireless video camera 170A and the wireless video camera 170B (FIG. 11 and FIG. 33). The wireless video camera 170A provides a video view in a direction (direction arrow 380) away from the snow blower apparatus 330. The wireless video camera 170B provides a video view in a direction (direction arrow 382) towards the snow blower apparatus 330. The operator may view the video views from the video cameras 170A and 170B on the video display unit 176.

The operator starts the snow blower motor 338 and depresses the blower control handle 337 in a downward direction (direction arrow 384). When depressed the blower control handle 337 causes the snow ejection apparatus 344 to operate and to blow snow 352 through the snow outlet chute 346. The blower control handle 337 is locked in the downward direction (direction arrow 384) to keep the snow ejection apparatus 344 in continuous operation. A drive wheel 386 of the snow blower apparatus 330 is free wheeling and provides no movement to the snow blower apparatus 330. Thus the snow blower apparatus 330 is free to move along the support surface 84. The operator uses the remote transmitter apparatus 40 to start the engine 28 of the hybrid remote control lawn mower 10R. Detailed descriptions including the operation of the hybrid remote control transmitter apparatus 40 are included in a previous description relating to FIG. 7. The operator uses the remote transmitter apparatus 40 to send a command to rotate the snow outlet chute 346 to a desired direction. Then the operator uses the remote transmitter apparatus 40 to command the hybrid remote control lawn mower apparatus 10R to move in a direction (direction 382) towards the pile of snow 352. The snow 352 enters the front snow inlet section 342 and the snow ejection apparatus 344 blows snow through the snow outlet chute 342 and away from the support surface 84. The operator may use the remote transmitter apparatus 40 to send commands to the hybrid remote control lawn mower apparatus 10R to steer in a direction to the right or to the left. Additionally, the operator may use the remote transmitter apparatus 40 to command the hybrid remote control lawn mower apparatus 10R to move in direction (direction arrow 380) away from the pile of snow 252. Then the front snow inlet section 342 is pulled away from the pile of snow 252. The operator may be at a location in a building away from the remote control lawn mower 10R. The operator uses the remote transmitter apparatus 40 to send commands to the remote control lawn mower 10R. At the same time, the operator may look at the video display unit 176 to see video display views in the direction 380 away from the snow blower apparatus and in a direction 382 towards the snow blower apparatus. These video views allow the operator to see which way to steer the hybrid remote control lawn mower 10R. To turn off the hybrid remote control lawn mower 10R, the operator releases the blower control handle 337 to stop the snow ejection apparatus 344. Then the operator turns off the snow blower motor 338. Next the operator uses the remote transmitter apparatus 40 to command the hybrid remote control lawn mower 10R to drive near a desired parking location. If desired, the operator may use the remote transmitter apparatus 40 to turn off the engine 28 of the hybrid remote control lawn mower. Then the operator may use the remote transmitter apparatus 40 to send commands to the hybrid remote control lawn mower 10R to use the battery powered right rear motor apparatus 14 and the left rear motor apparatus 16 to steer and propel the remote control lawn mower 10R to the desired parking location.

The foregoing description of the present invention has been presented for purposes of illustration and description. It is not intended to be exhaustive or to limit the invention to the precise form disclosed, and many modifications and variations are possible in light of the above teaching. For example, the remote transmitter apparatus 40 and the receiver apparatus 42 may include any number of channels. Additional channels may be used for any suitable application such as engine 28 speed control, switching power on and off to other devices (e.g., leaf blower 248, weed trimmer 254, edge trimmer 263, hedge trimmer 270, etc.). Such modifications and variations that may be apparent to a person skilled in the art are intended to be included within the scope of this invention as defined by the accompanying claims.

We claim:

1. A hybrid remote control lawn mower comprising:
    a frame;
    a right rear motor apparatus attached to the frame for propelling the hybrid remote control lawn mower;
    a left rear motor apparatus attached to the frame for propelling the hybrid remote control lawn mower;
    a right front free swiveling wheel apparatus rotatably attached to the frame;
    a left front free swiveling wheel apparatus rotatably attached to the frame;
    a lawn mower deck adjustably suspended from the frame wherein the lawn mower deck may be raised and lowered relative to the frame;
    an engine attached to the lawn mower deck;
    at least one lawn mower blade connected to a rotating drive shaft of the engine to mow lawn;
    an alternator apparatus attached to the lawn mower deck for providing electric power, wherein the alternator apparatus is rotatably connected with the engine;
    a battery for storing the electric power;
    a voltage regulator for regulating the output voltage of the alternator;
    a remote control transmitter that sends a set of command signals to a receiver apparatus;
    a brain control system that receives the set of command signals from the receiver and controls the electric power sent to the right rear motor apparatus and the left rear motor apparatus;
    wherein the hybrid remote control lawn mower turns to the right when the brain control system sends a greater electric current to the left rear DC motor than to the right rear DC motor; and the hybrid remote control lawn mower turns to the left when the brain control system sends a greater electric current to the right rear motor than to the left rear DC motor and wherein the hybrid remote control lawn mower goes straight ahead when the brain control system sends an equal amount of electric current to the right rear DC motor and the left rear DC motor; and
    a loss of radio wave signal detector between the remote control transmitter and receiver apparatus that stops operation of the engine and shuts off the electric power to the right rear motor apparatus and to the left rear motor apparatus.

2. The hybrid remote control lawn mower of claim 1, wherein the set of command signals sent from the remote control transmitter to the receiver apparatus includes speed and direction control commands to the right rear motor apparatus and the left rear motor apparatus.

3. The hybrid remote control lawn mower of claim 1, wherein the set of command signals sent from the remote control transmitter to the receiver apparatus includes a command for starting and stopping the engine.

4. The hybrid remote control lawn mower of claim 1, wherein the set of command signals sent from the remote control transmitter to the receiver apparatus includes a command to reset the brain control system.

5. The hybrid remote control lawn mower of claim 1, wherein the set of command signals sent from the remote control transmitter to the receiver apparatus includes a command to turn on and off electric power to an auxiliary electric motor.

6. The hybrid remote control lawn mower of claim 1, wherein the remote control transmitter includes a precision low speed control region for providing very slow speed movement of the hybrid remote control lawn mower.

7. The hybrid remote control lawn mower of claim 1, wherein the remote control transmitter includes a safety button that an operator must depress in order to maintain operation of the engine and the right rear motor apparatus and the left rear motor apparatus.

8. The hybrid remote control lawn mower of claim 1, wherein a current sensor detects excessive electric current to the right rear motor apparatus and the left rear motor apparatus and electric power is removed from the right rear motor apparatus and the left rear motor apparatus.

9. The hybrid remote control lawn mower of claim 1, wherein a heat sink is clamped to a set of MOSFET current devices to remove heat generated in the MOSFET devices when the MOSFET current devices are supplying electric current to the right rear motor apparatus and to the left rear motor apparatus.

10. The hybrid remote control lawn mower of claim 9, wherein the set of MOSFET current devices include a temperature sensor to measure temperatures of the set of MOSFET current devices so that the electric current to the right rear motor apparatus and to the left rear motor apparatus is shut off at a predetermine temperature level.

11. The hybrid remote control lawn mower of claim 1, wherein the engine is selected from the group consisting of gasoline, diesel, liquid petroleum, bio fuel, hydrogen, and fuel cell.

12. The hybrid remote control lawn mower of claim 1, wherein the engine includes an exhaust emission control system.

13. The hybrid remote control lawn mower of claim 1, wherein the engine includes an exhaust silencer to reduce noise levels below a predetermined level.

14. The hybrid remote control lawn mower of claim 1, wherein during slowing down the right rear motor apparatus and the left rear motor apparatus generate electric power that is stored in the battery.

15. The hybrid remote control lawn mower of claim 1, further including a headlight for providing illumination in low lighting conditions.

16. The hybrid remote control lawn mower of claim 1, further including at least one wireless video camera to allow remote viewing of a scene around the hybrid remote control lawn mower.

17. The hybrid remote control lawn mower of claim 1, further including at least one bumper attached to the frame, wherein when the bumper is contacted the hybrid remote control lawn mower stops movement.

18. The hybrid remote control lawn mower of claim 1, further including a pattern recognition apparatus to learn locations of objects to avoid.

19. The hybrid remote control lawn mower of claim 1, further including a counter weight assembly to enable the hybrid remote control lawn mower to travel along a contour line of a hill.

20. The hybrid remote control lawn mower of claim 1, further including an anti-tipping assembly to prevent the hybrid remote control lawn mower from tipping.

21. The hybrid remote control lawn mower of claim 1, further including a hitch assembly attached to the frame of the hybrid remote control lawn mower.

22. The hybrid remote control lawn mower of claim 21, further including an electrical insulation means between a hitch support arm of the hitch assembly and a tow bar to prevent radio wave signal interference.

23. The hybrid remote control lawn mower of claim 21, further including a wagon apparatus connected to the hitch assembly.

24. The hybrid remote control lawn mower of claim 21, further including a spreader apparatus connected to the hitch assembly.

25. The hybrid remote control lawn mower of claim 21, further including a dethatcher apparatus connected to the hitch assembly.

26. The hybrid remote control lawn mower of claim 21, further including a lawn clippings collector apparatus connected to the hitch assembly.

27. The hybrid remote control lawn mower of claim 21, further including a snow blower apparatus connected to the hitch assembly for blowing snow from a surface.

28. The hybrid remote control lawn mower of claim 27, further including a remote controlled snow rotation apparatus for rotating a snow outlet chute of the snow blower apparatus.

29. The hybrid remote control lawn mower of claim 1, further including a leaf blower apparatus attached to the frame.

30. The hybrid remote control lawn mower of claim 1, further including a weed trimmer apparatus attached to the frame.

31. The hybrid remote control lawn mower of claim 1, further including an edge trimmer apparatus attached to the frame.

32. The hybrid remote control lawn mower of claim 1, further including a right rear tire attached to the right rear motor apparatus and a left rear tire attached to the left rear motor apparatus.

33. The hybrid remote control lawn mower of claim 32, wherein the right rear tire and the left rear tire is selected from a group consisting of smooth, knobby and V shape.

34. The hybrid remote control lawn mower of claim 1, further including a first track attached to the right rear motor apparatus and a second track attached to the left rear motor apparatus.

35. The hybrid remote control lawn mower of claim 1, further including a blade apparatus attached to the frame for pushing loose material on a surface.

36. The hybrid remote control lawn mower of claim 1, further including a fluid blade apparatus attached to the frame for pushing loose material on a surface.

37. The hybrid remote control lawn mower of claim 36, further including a power blower to provide pressurized air to the fluid blade apparatus.

* * * * *